(12) United States Patent
Williams et al.

(10) Patent No.: US 10,095,650 B2
(45) Date of Patent: Oct. 9, 2018

(54) HIGH SPEED CONTROLLER AREA NETWORK (CAN) IN DENTAL EQUIPMENT

(71) Applicant: A-dec, Inc., Newberg, OR (US)

(72) Inventors: Ryan M. Williams, Sherwood, OR (US); Paul Scott Bontrager, Newberg, OR (US)

(73) Assignee: A-dec, Inc., Newberg, OR (US)

( * ) Notice: Subject to any disclaimer, the term of this patent is extended or adjusted under 35 U.S.C. 154(b) by 141 days.

(21) Appl. No.: 15/090,363

(22) Filed: Apr. 4, 2016

(65) Prior Publication Data

US 2017/0286351 A1    Oct. 5, 2017

(51) Int. Cl.
| | | |
|---|---|---|
| G06F 13/00 | (2006.01) | |
| G06F 13/42 | (2006.01) | |
| H04L 29/08 | (2006.01) | |
| G06F 13/40 | (2006.01) | |
| H04L 12/40 | (2006.01) | |
| H04L 25/02 | (2006.01) | |

(52) U.S. Cl.
CPC ...... *G06F 13/4265* (2013.01); *G06F 13/4068* (2013.01); *H04L 12/40* (2013.01); *H04L 67/104* (2013.01); *H04L 25/0298* (2013.01); *H04L 2012/40215* (2013.01)

(58) Field of Classification Search
CPC .......... H04L 25/0298; G06F 13/4265
See application file for complete search history.

(56) References Cited

U.S. PATENT DOCUMENTS

| | | |
|---|---|---|
| 6,470,222 B1 | 10/2002 | Davidson et al. |
| 6,506,050 B1 | 1/2003 | Steddin |
| 7,011,519 B2 | 3/2006 | Castellini |
| 7,258,546 B2 | 8/2007 | Beier et al. |
| 7,421,608 B2 | 9/2008 | Schron |
| 7,455,520 B2 | 11/2008 | Sorensen et al. |
| 7,739,125 B2 | 6/2010 | Sorensen et al. |

(Continued)

FOREIGN PATENT DOCUMENTS

| | | |
|---|---|---|
| EP | 0293197 | 11/1988 |
| EP | 0766949 | 1/2003 |

(Continued)

OTHER PUBLICATIONS

European Search Report for European Application No. 17164609.4, dated May 11, 2017.
Extended European Search Report for European Application No. 17164609.4, dated Aug. 14, 2017.

(Continued)

*Primary Examiner* — Tammara R Peyton
(74) *Attorney, Agent, or Firm* — Klarquist Sparkman, LLP

(57) ABSTRACT

A system comprises a plurality of nodes connected in a peer-to-peer network via a communication interface. At least one node of the plurality of nodes comprises a transceiver, at least two connectors, at least one termination resistance module coupled to the transceiver, the at least one termination resistance module providing termination resistance within the node, a first detection circuit coupled to a first connector of the at least two connectors, and a second detection circuit coupled to a second connector of the at least two connectors. The first and second detection circuits are configured to detect that the node is coupled to one or more other nodes in the peer-to-peer network, and automatically adjust the termination resistance based on the detecting.

17 Claims, 31 Drawing Sheets

(56) References Cited

U.S. PATENT DOCUMENTS

| | | | |
|---|---|---|---|
| 7,761,174 B2 | 7/2010 | Nyholm | |
| 7,893,926 B2 | 2/2011 | Nyholm | |
| 8,219,239 B2 | 7/2012 | Andell et al. | |
| 8,452,614 B2 | 5/2013 | Nyholm | |
| 8,597,054 B2 * | 12/2013 | Dozier | H04L 25/0298 439/188 |
| 8,620,462 B2 | 12/2013 | Nyholm | |
| 2004/0059197 A1 | 3/2004 | Yamashita et al. | |
| 2004/0183352 A1 | 9/2004 | Schron | |
| 2006/0177795 A1 | 8/2006 | Sorensen et al. | |
| 2006/0209038 A1 | 9/2006 | Nyholm | |
| 2007/0003901 A1 | 1/2007 | Franco | |
| 2007/0026359 A1 | 2/2007 | Sorensen et al. | |
| 2007/0103270 A1 | 5/2007 | Gmeinder et al. | |
| 2007/0120574 A1 | 5/2007 | Houston et al. | |
| 2007/0121832 A1 | 5/2007 | Ghoshal | |
| 2007/0244581 A1 | 10/2007 | Nyholm | |
| 2008/0120137 A1 | 5/2008 | Hyholm | |
| 2009/0162808 A1 | 6/2009 | Nyholm | |
| 2010/0070903 A1 | 3/2010 | Andell et al. | |
| 2010/0092913 A1 | 4/2010 | Andell et al. | |
| 2010/0199203 A1 | 8/2010 | Bauer et al. | |
| 2013/0116805 A1 | 5/2013 | Frochaux et al. | |
| 2014/0350963 A1 | 11/2014 | Kinlen et al. | |
| 2017/0286350 A9 * | 10/2017 | Brouwer | G06F 13/4221 |

FOREIGN PATENT DOCUMENTS

| | | |
|---|---|---|
| EP | 0734689 | 2/2003 |
| EP | 0845247 | 2/2003 |
| EP | 1395196 | 3/2004 |
| EP | 1547565 | 6/2005 |
| EP | 0993808 | 2/2006 |
| EP | 1726269 | 11/2006 |
| EP | 1603478 | 10/2008 |
| EP | 1738711 | 1/2009 |
| EP | 2143029 | 1/2010 |
| EP | 1605854 | 9/2010 |
| EP | 1725206 | 8/2011 |
| WO | WO02/100289 | 12/2002 |
| WO | WO2004/080324 | 9/2004 |
| WO | WO2004/084753 | 10/2004 |
| WO | WO2005/034784 | 4/2005 |
| WO | WO2005/070366 | 8/2005 |
| WO | WO2006/037862 | 4/2006 |
| WO | WO2007/006804 | 1/2007 |
| WO | WO2008/113888 | 9/2008 |
| WO | WO2008/119874 | 10/2008 |
| WO | WO2012/121891 | 9/2012 |

OTHER PUBLICATIONS

Communication pursuant to Article 94(3) EPC, EP Application No. 17 164 609.4-1216, dated Jul. 9, 2018, 6 pages.

* cited by examiner

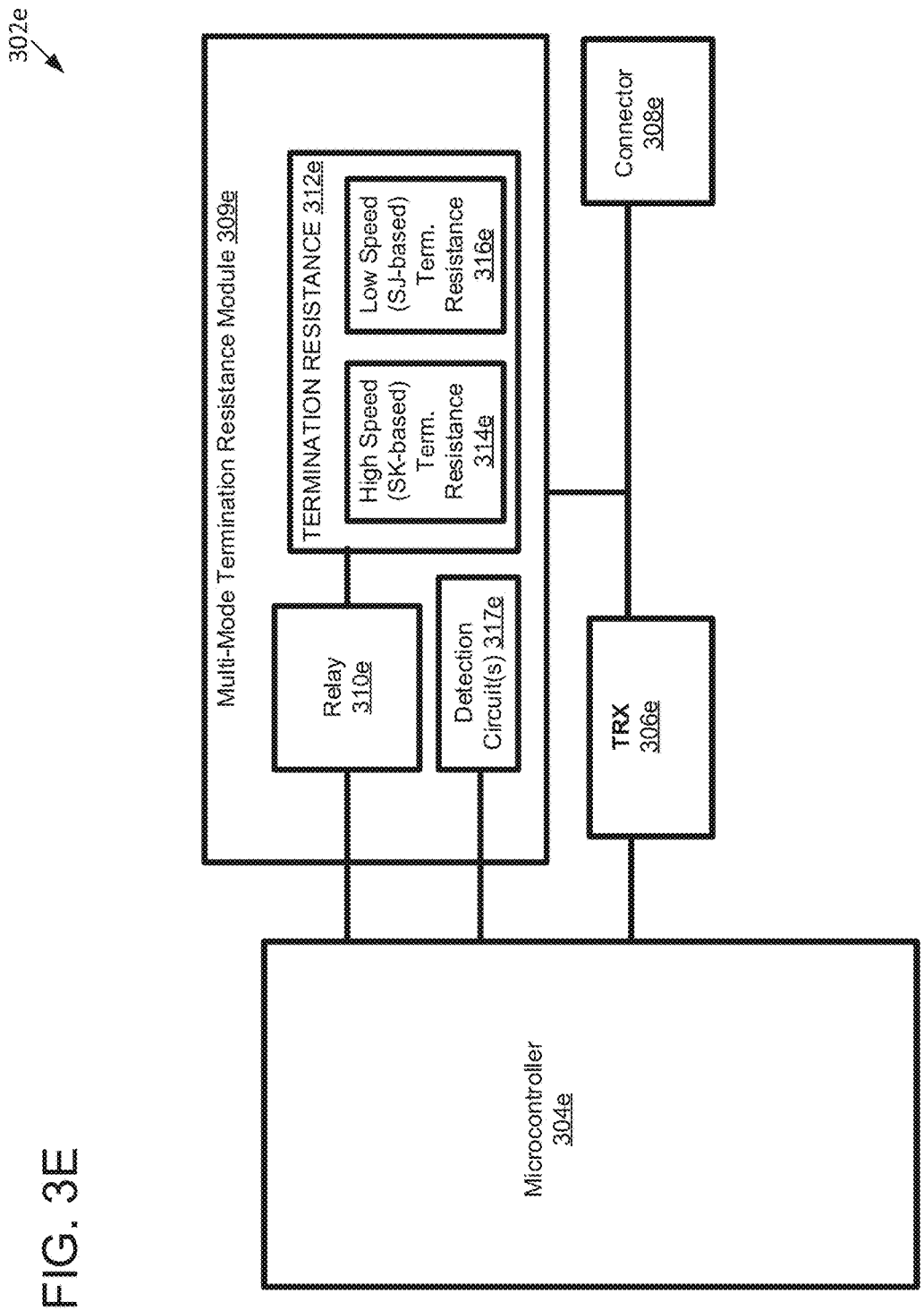

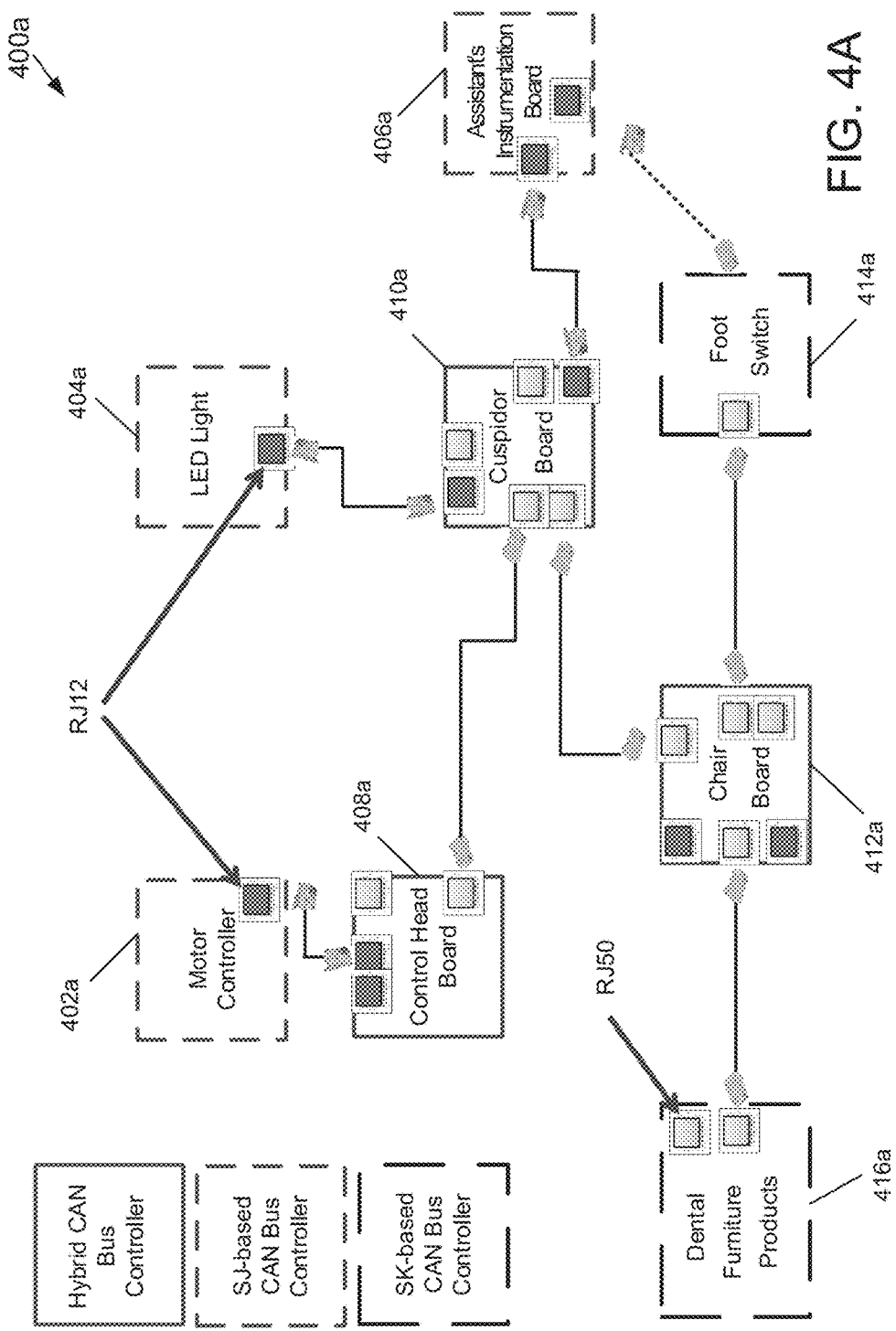

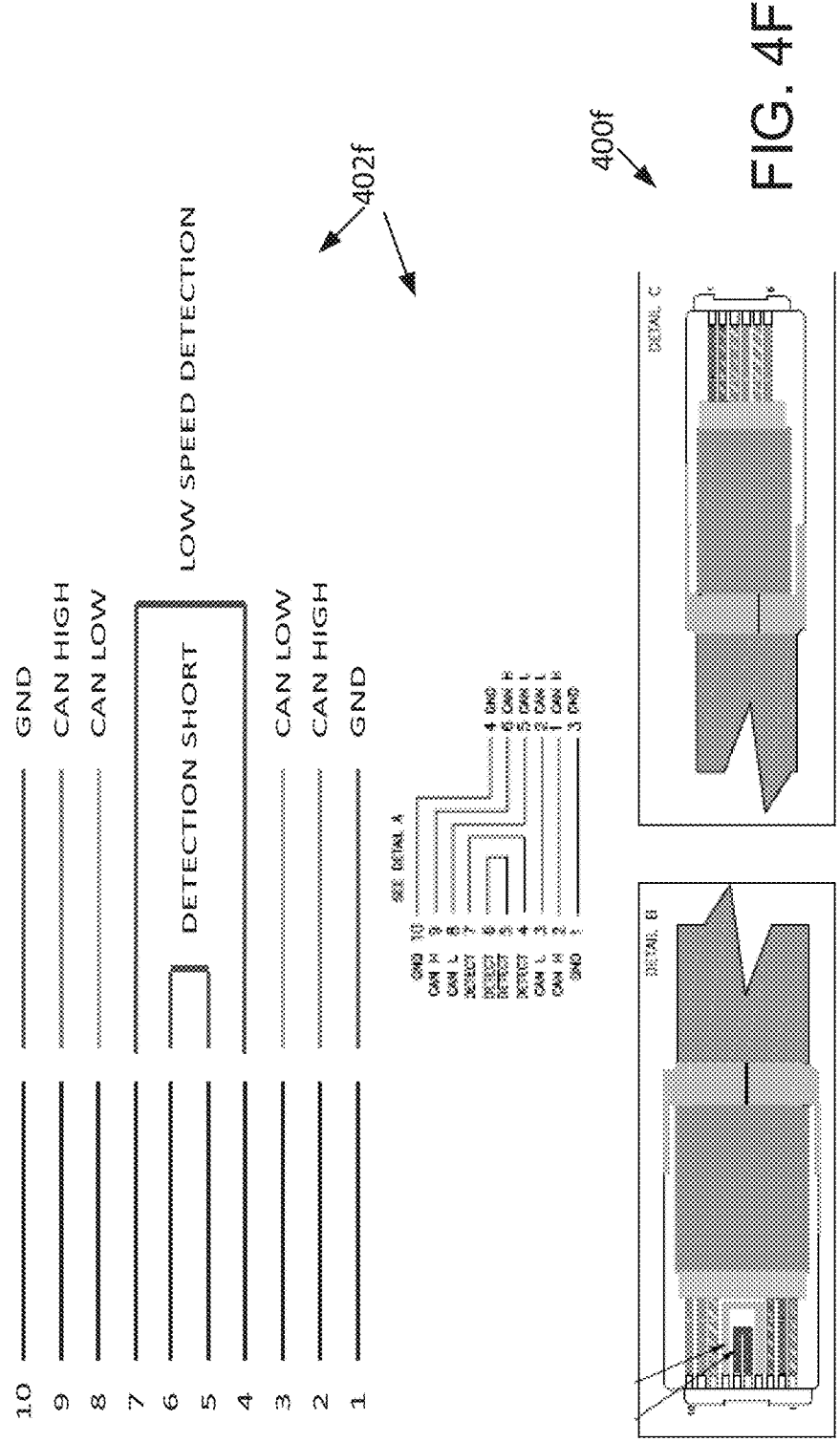

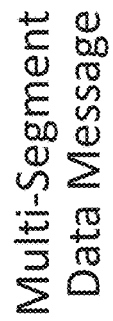
FIG. 6A Header Message
FIG. 6B Multi-Segment Data Message

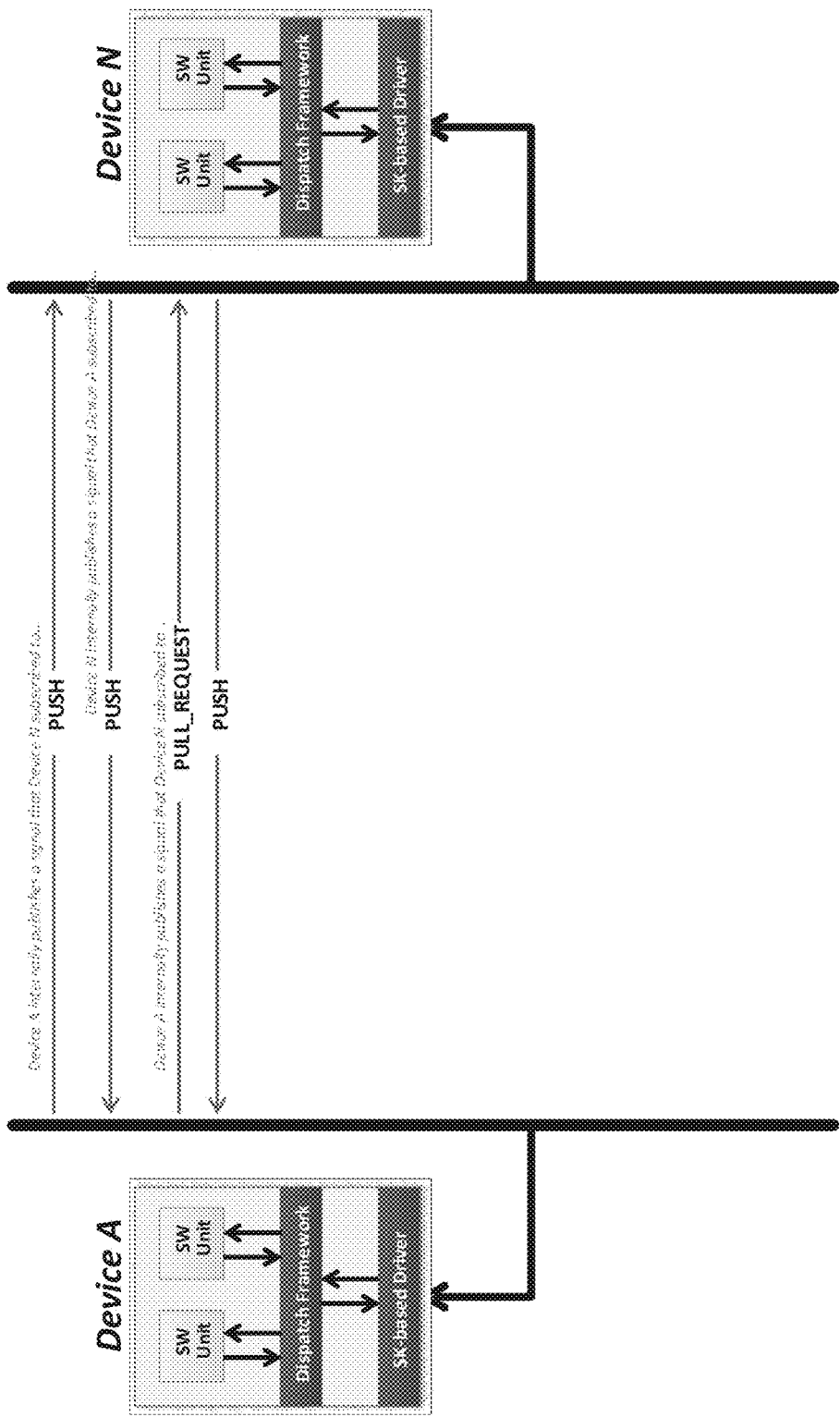

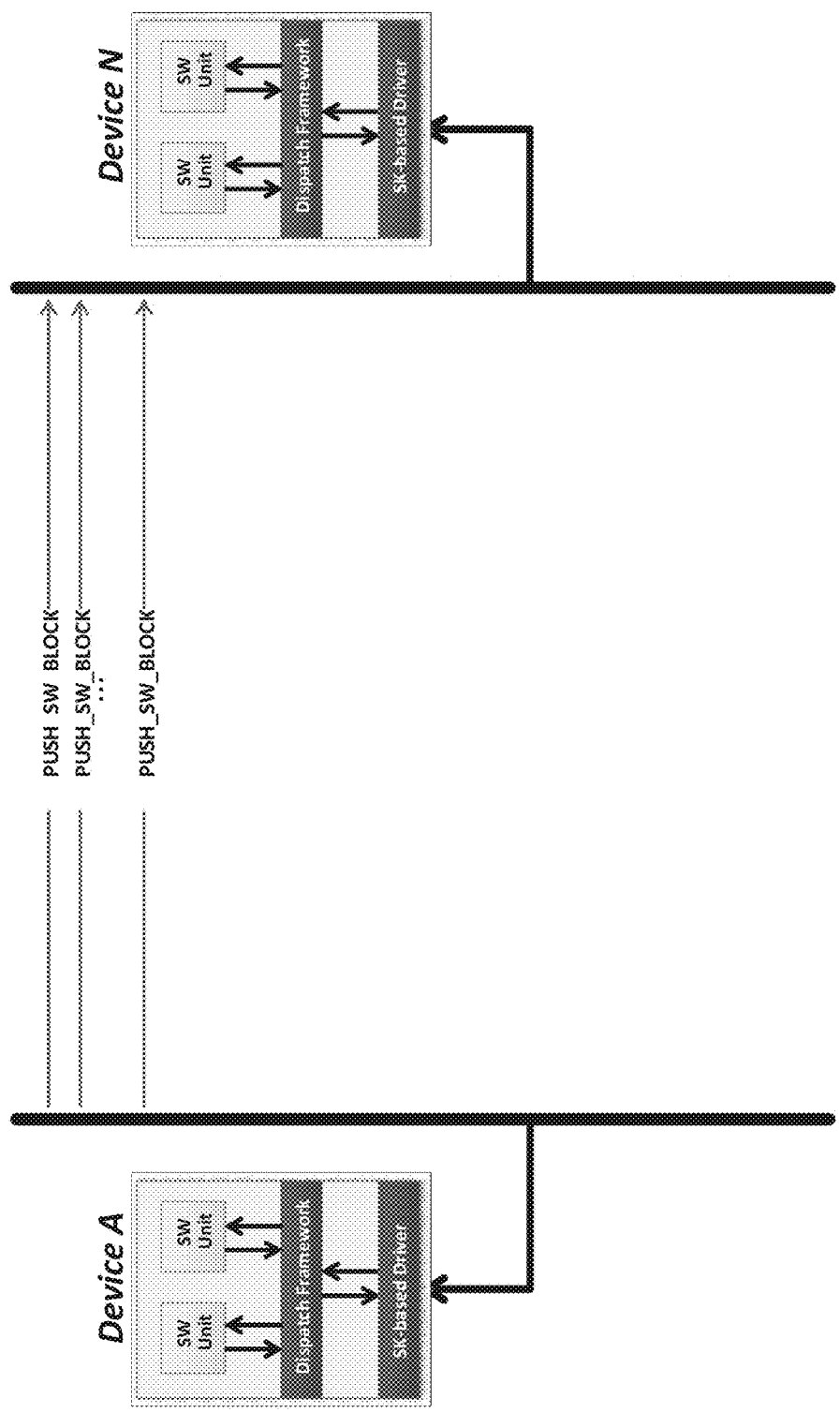

US 10,095,650 B2

HIGH SPEED CONTROLLER AREA NETWORK (CAN) IN DENTAL EQUIPMENT

BACKGROUND

A Controller Area Network (CAN) bus is a vehicle bus standard developed by Robert Bosch, GmbH to allow automotive-related microcontrollers and devices to communicate with each other without a centralized (host) computer terminal. Conventionally, a CAN bus network is linear, which can be beneficial in an automotive environment but can be a drawback if the CAN bus network is to be used in other environments where a branched configuration is preferred.

One example where a branched configuration is preferred is a dental equipment network. While linear connections can be easy to assemble, dental equipment networks can include modules that are remote from the rest of the network (e.g., an activator pedal or a dental light) and connecting such remote modules in a linear configuration can require long lengths of cable, which decreases communication efficiency. Additionally, linear networks conventionally can overcome these limitations by requiring a resistor termination at every node (e.g., each separate piece of dental equipment) connected in a linear configuration, by using other end-point terminations (e.g., added by a technician), and/or by using a fixed set of circuit boards for defining end-points. However, individual termination resistance at every node can significantly decrease the communication speed in the dental equipment network, manually installed endpoint terminations (e.g., added by a technician) are vulnerable to human error and a fixed set of circuit boards can limit configuration flexibility.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, two communication methods can be used in connection with various embodiments described herein. The two communication methods are referred herein as "Standard J" (or SJ) and "Standard K" (or SK), and can be used in connection with one or more CAN bus communication networks using CAN bus controllers (or boards) as described herein. Standard J and Standard K are characterized based on the following functionalities associated with each method:

Standard J

SJ is based upon various aspects of the ISO 11898 standard as well as derivatives of the ISO 11898 standard. A single transceiver is used per board/controller, however, it is theoretically possible to use more than one transceiver per board. Each board's transceiver is terminated with a termination resistor (e.g., a 330Ω resistor). A CAN bus network configuration based on SJ can include a linear or a mesh/branch network. Each board/controller in a SJ communication network uses one or more connections to connect data between various other boards/controllers. These connections may include connectors (e.g., RJ12 connectors), soldered wires, or terminal strips. A single transceiver can support one or more (e.g., 1, . . . , N) CAN bus connections. A CAN bus network based on SJ supports a range of board quantities depending upon termination resistor size, connection length, and other parameters. Only one SJ network is present between connected circuit boards, with cable length maximum of over a thousand feet in some configurations. The maximum communication speed in a SJ-based network depends upon the configuration (with specific configurations being able to run at slower and faster). A SJ-based network may run at a relatively slower speed (e.g. 31250 bps) to accommodate a greater range of boards, configurations, and cable lengths. An example embodiment can include an SJ-based network using RJ12 connectors, 330Ω termination resistors on the transceiver(s) at each node, with up to 20 boards per network and operate at nominal speeds of about 31250 bps.

Standard K

SK is also based upon various aspects of the ISO 11898 standard as well as derivatives of the ISO 11898 standard. One or more transceivers can be used per board, with the endpoint circuit boards of each network being terminated (intermediate boards may also be terminated, but this may be undesirable due to potential decrease in the communication speed). SK may use a detection method of cable's presence within connectors to determine which boards are endpoints. Typically, with two connectors per transceiver, a single detected cable connection would indicate an end-point and two detected cable connections would indicate an intermediate board (i.e., not an end-point). SK can also use a dynamic method to apply or remove the termination resistance at the various transceivers on boards/controllers (an exception could be a single-connector SK CAN device, which is theoretically always an end-point of the respective linear network).

SK-based CAN bus networks can include linear networks with terminated end-points. CAN bus networks using SK can also include a mesh or a branch network, however generally mesh or branch networks are not preferable since they tend to reduce communication speed. Each board/controller in a SK communication network uses one or more connections to connect data between various other boards/controllers. These connections can include connectors (e.g., RJ50 connectors), soldered wires, or terminal strips with a single transceiver supporting one or two connections. In some instances, a transceiver could support more than two connectors (e.g., for purposes of implementing a non-linear network). A CAN bus network based on SK supports a range of board quantities depending upon termination resistor size, connection length, and other parameters. A range of boards is supported on the same network (with 1, . . . , N networks being present/possible between connected circuit boards). A CAN bus network based on SK can include bridges (e.g., SK-to-SK bridges), with the SK-based network being able to support an infinite number of networks and connections (boards). The cable length maximum for a CAN bus network using SK may be over a thousand feet. The maximum communication speed in a SK-based network depends upon the configuration (with specific configurations being able to run at slower and faster). A SK-based network may run at a relatively faster speed (e.g. 615380 bps) as compared to SJ-based networks to accommodate a greater range of data while it may still support similar board quantities, cable lengths, and/or configurations similar to SJ-based networks given more efficient termination possibilities described. An example embodiment can include an SK-based networks using two RJ50 connectors per transceiver, 99.8Ω termination resistors on the transceiver(s) at endpoints (and no termination resistors at non-endpoints), a method for detecting endpoints or non-endpoints and applying or removing the termination in accordance, a system comprised of up to 20 boards per network and operate at nominal speeds of 615380 bps.

In accordance with one or more aspects, SK devices (e.g., 302e) can connect to a SJ-based network. One way an SK device may connect with an SJ-based network is with the use of a hybrid cable (e.g., RJ50-to-RJ12 cable 400f), detection logic for the hybrid cable, and the ability to switch between SK and SJ termination (e.g., FIGS. 3E and 4E). As described above, SJ and SK networks may use a range of connection methodologies.

In accordance with one or more aspects, an SK-based network can communicate with a SJ-based network through the use of SJ-to-SK communication bridges (e.g., FIGS. 4B-4C).

In accordance with one or more aspects, a CAN bus controller compliant with a SK-based network can be referred to as a SK controller (or SK board), and a CAN bus controller compliant with a SJ-based network can be referred to as a SJ controller (or SJ board). Additionally, as explained above, a SJ controller will have a nominal communication speed that is lower than the nominal communication speed for a SK controller. In this regard, a SJ controller can be referred herein as a "low-speed" controller, and a SK controller can be referred to as a "high-speed" controller. The SJ controller can be regarded as being a lower speed controller and the SK controller can be regarded as a higher speed controller.

In accordance with one or more aspects, a system includes a plurality of nodes connected in a peer-to-peer network via a communication interface. At least one node possesses the capability to modify the termination resistance within the at least one node based on whether the node is a network endpoint or non-endpoint. The at least one node possessing this capability includes a transceiver, at least two connectors, and at least one termination resistance module coupled to the transceiver. The at least one termination resistance module provides termination resistance within the node. The node also includes a first detection circuit coupled to a first connector of the at least two connectors, and a second detection circuit coupled to a second connector of the at least two connectors. The detection circuits are configured to detect that the node is coupled to one or more other nodes in the peer-to-peer network, and automatically adjust the termination resistance based on the detecting.

In accordance with one or more aspects, a method for dynamically switching termination resistance in a network node is disclosed, where the node is connected in a peer-to-peer network via at least one of a plurality of available connectors. The method includes adding a termination resistance within the node, upon detecting that the node is coupled to the network via a single connecting cable coupled to a first connector of the plurality of connectors. The detecting is based on a shorted pair of connector pins for the single connecting cable. Upon detecting the node is coupled to the network via at least one other connecting cable plugged into at least a second connector of the plurality of connectors, the termination resistance within the node is removed.

In accordance with one or more aspects, a method for communicating information in a peer-to-peer network of a plurality of nodes can include receiving at a first node of the plurality of nodes, a subscription request from a second node of the plurality of nodes. The subscription request can specify one or more signals for use by the second node, so that the one or more signals are sent to the second node whenever the signals are generated, modified or updated. Mapping data is generated by the first node, based on the subscription request. The mapping data can identify signal subscriptions of one or more of the plurality of nodes.

As described herein, a variety of other features and advantages can be incorporated into the technologies as desired.

BRIEF DESCRIPTION OF THE DRAWINGS

FIG. 3E is a block diagram of SK-based CAN bus controller with multi-mode self-termination resistance, in accordance with an example embodiment of the disclosure.

FIG. 4A is a diagram of a hybrid dental equipment network using SJ-based and SK-based CAN bus controllers connected in a branched configuration, in accordance with an example embodiment of the disclosure.

FIG. 4F is a diagram of an example hybrid connector cable, which can be used in connection with FIG. 4E.

FIGS. 6A-6B illustrate Hock diagrams of example message formats can be used in a communication framework of a CAN bus controller network.

FIGS. 6C-6M illustrate various types of communications in a communication framework of a SJ-based and/or SK-based controller network.

DETAILED DESCRIPTION

General Overview of SJ-Based CAN Bus Networks

In accordance with an example embodiment of the disclosure, a CAN bus network can be used in connection with a dental equipment/instrument network. However, a single linear network is often not suitable for a dental equipment network as devices in such network are often mounted on arms or other structures arranged in a branched configuration. If a new dental device has to be connected in a linear dental device network, two separate connecting cables may have to be run so that the new device is connected in the middle of the linear network, which can be difficult and cost-prohibitive. Errors with making proper CAN bus cable connections can be made during manufacturing assembly or when equipment is serviced. Another important consideration is termination resistance, which must be placed at the network endpoints for greatest performance (generally for 5K-based CAN bus network). Placing termination resistors at each node allows for branching of the network and alleviates the need to determine whether a node is an endpoint but can limit the overall speed (to a SJ-based CAN bus network).

Figure 1:
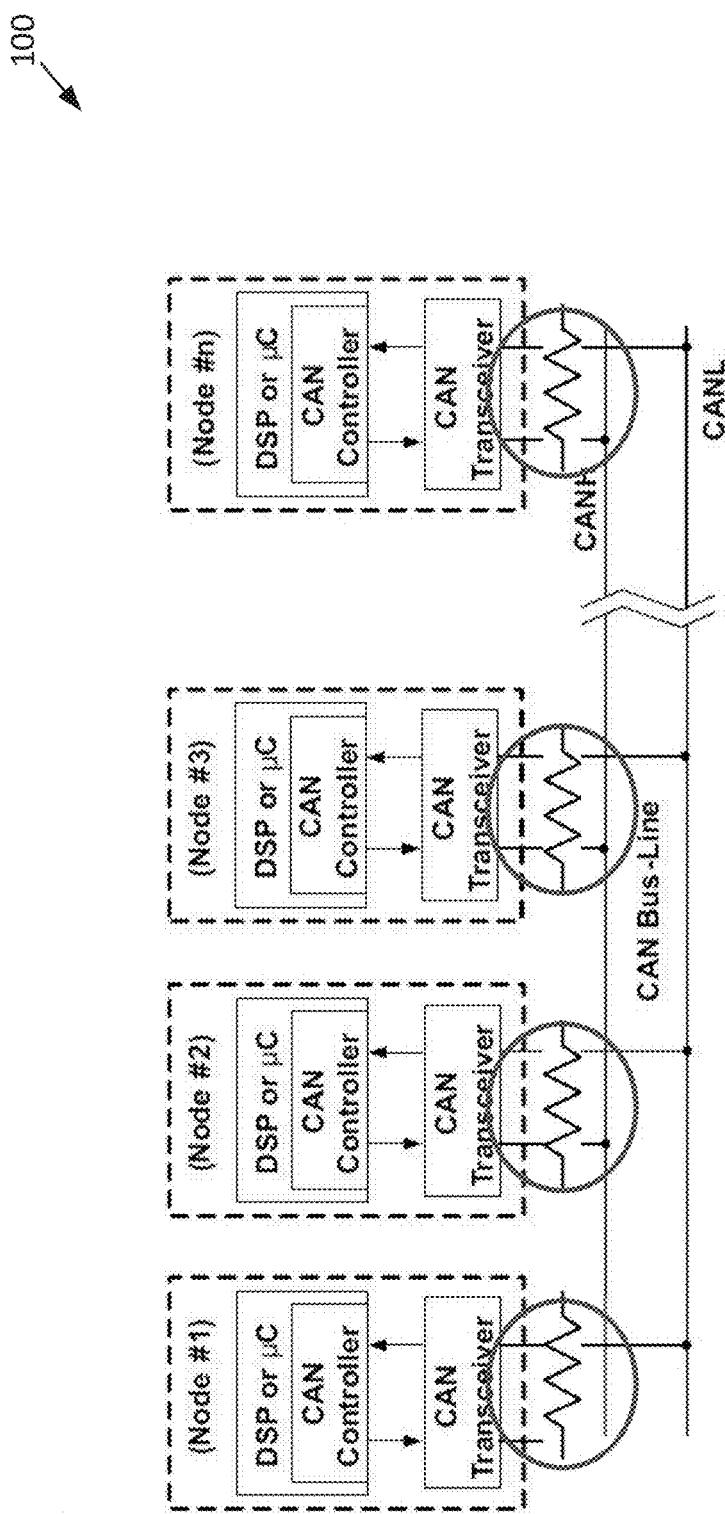
FIG. 1 is a schematic diagram of a linear Standard J (SJ)-based CAN bus network with termination resistors present at each circuit board.

FIG. 1 is a schematic diagram of a linear Standard J (SJ)-based CAN bus network with termination resistors present at each circuit board. As illustrated in FIG. 1, the linear SJ-based network 100 includes a plurality of nodes (or controllers) 1, n. Each of the nodes can include a digital signal processor (DSP) and a CAN transceiver. The DSP can be a CAN microcontroller or another type of processor (such as a field programmable gate array, a CPU, and so forth). The DSP may further comprise suitable circuitry, interfaces, logic and/or code and is configured to receive incoming bits from the transceiver and compose a message for interpretation, interpret/translate received messages, and determine what messages to transmit (e.g., in response to received messages). The CAN microcontroller can also send bits from a transmit message to the transceiver for communication to another node. As used herein, the terms node, controller and a board are used interchangeably.

As seen in FIG. 1, the SJ-based CAN bus network 100 uses a termination resistor at each node. Even though this methodology eliminates the need to manage termination resistors at endpoints, the communication speed can be significantly reduced based on the total number of CAN bus nodes and the presence of termination resistance at each node (hence, the designation "low-speed" when referring to a SJ node or SJ-based network).

In contrast, SK-based linear CAN bus networks require termination resistors only at both endpoints of the linear network (and not at intermediate nodes) to achieve optimal performance. However, with a "mix-and-match" platform of integrated dental equipment/instrument devices, it is not possible to always know how many modules will be connected or in what arrangement; configuration (i.e., linear or branched). Additionally, modules may be later added or removed, and ensuring that appropriate termination resistors are in place at each endpoint but not at other nodes is a challenge.

Overview of SK-Based CAN Bus Network

SK-based CAN bus networks can generally achieve higher communication speeds than SJ-based CAN bus networks by preferably being configured as linear networks with termination resistance at endpoint nodes and without termination resistance at non-endpoint nodes. In accordance with an example embodiment of the disclosure, a SK-based CAN bus network may utilize self-terminating endpoints (i.e., nodes or controllers) with dynamic cable detection to allow for modular "mix & match" platform design. As used herein, the term "self-termination" or "self-terminating endpoint" refers to a node (or a controller) that is configured to automatically detect whether or not it is an endpoint, and then to automatically apply (or remove) termination resistance based on such determination. A SK-based CAN bus controller can include a microprocessor, one or more transceivers, a termination resistance module for each transceiver, and up to two connectors for each transceiver. Preferably, each connector is associated with a detection circuit, which can be used to automatically detect if a cable is present within the connector, and determine whether the controller is (or is not) an endpoint (e.g., if only one of the connectors is detected to have a cable present, then the controller is an endpoint; if two of the connectors are coupled to the network via cables connected to the connectors then the controller is not an endpoint). The termination resistance module is configured to automatically apply termination resistance if it is determined that the controller is an endpoint. As an alternative, termination resistance can be applied by default (i.e., it is assumed the controller is an endpoint), and the termination resistance module can be removed when it is determined that both connectors associated with a transceiver have connector cables inserted therein.

In example embodiments, SJ-based and SK-based. CAN bus communications can be achieved via separate transceivers on a single controller, each transceiver coupled to one or more SJ-based and/or SK-based connectors, respectively (e.g., one transceiver can be used per one or two connectors).

In accordance with an example embodiment of the disclosure, a SK-based CAN bus controller can include a microcontroller, a transceiver, two connectors (e.g., labelled A and B), a termination resistance module, and a single detection circuit coupled to connector B. The controller can be labelled so that a first connecting cable can be inserted into connector A, and a second connector cable (if needed) is inserted into connector B. In instances when only one cable is connected to the controller, then the connecting cable is connected to connector A and the termination resistance module is activated by default (e.g., termination resistance can be active when zero or one cables are present) as the controller is an endpoint. In instances when a second connection is present (i.e., using connector B), then the single detection module coupled to connector B can detect a connecting cable is present in connector B, thereby determining that the node is no longer an endpoint as both connectors A and B have present cables. In this case, the termination resistance can be deactivated/removed as the controller is no longer an endpoint.

By using multi-connector nodes with automatic endpoint detection and self-termination, a SK-based CAN bus can be configured/established to operate at higher speeds (e.g., by having termination resistance only at the endpoints) without intervention from a field technician. In this regard, a SK-based CAN bus network design with self-termination capability does not require the presence of two specific boards but instead requires the presence of any two (or more) boards, where at least one of the boards is equipped with detection circuits and automatic self-termination, as described below.

Figure 2:
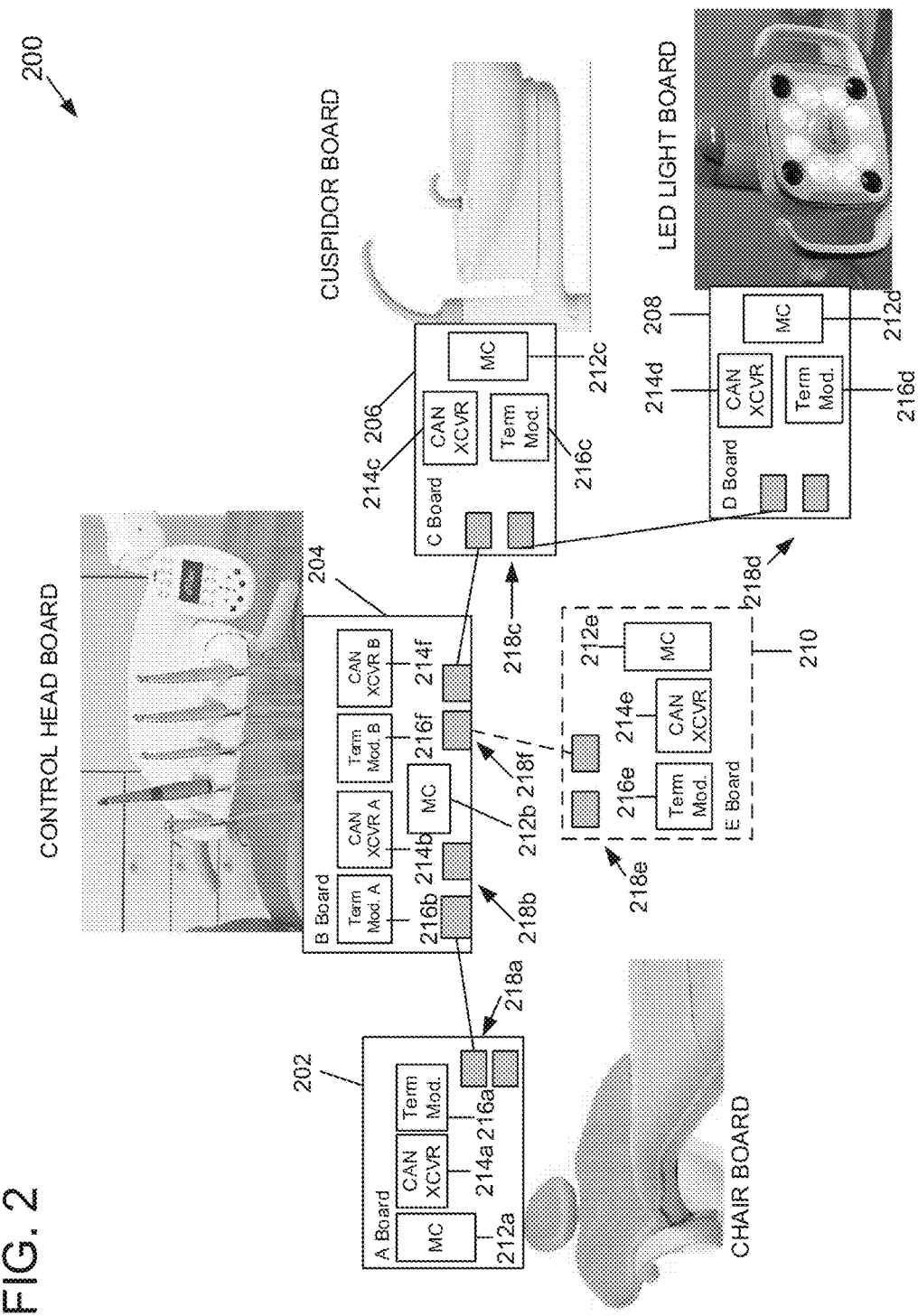
FIG. 2 is a schematic diagram of a dental equipment network using SK-based. CAN bus controllers connected in a branched configuration and using self-termination resistance, in accordance with an example embodiment of the disclosure.

FIG. 2 is a schematic diagram of a dental equipment network using SK-based CAN bus controllers connected in a branched configuration and using self-termination resistance, in accordance with an example embodiment of the disclosure. Referring to FIG. 2, the SK-based CAN bus network 200 includes a plurality of controllers (i.e., controller boards or nodes) 202-208. For example, controller board 202 is a chair board (for controlling a dental chair), controller board 204 is a control head board, controller board 206 is a cuspidor board, and controller hoard 208 is an LED light board.

As seen in FIG. 2, the controllers 202-208 can be connected in various linear configurations. In instances when controllers 202 and 204 are coupled via a single cable, a single SK-based network is formed between controllers 202 and 204. As a single connection is present at connectors 218a and 218b, these connections result in controllers 202 and 204 being endpoints. However, since each controller can include two or more connectors, thereby supporting multiple linear High Speed networks (e.g., controller 204), a branched configuration is also possible. In this regard, for each SK-based network connection on a board, preferably there is a maximum of two connectors that can be used per transceiver (i.e., preferably one or two connectors but additional connectors per transceiver are also possible). In this regard, each grouping of one or two connectors per board, requires a CAN bus transceiver. As seen on controller 204, connectors 218b are supported by transceiver 214b. Also on this board, to support greater than two connections to allow for branched cabling in the system, addition two connectors are present (e.g., 218f) with an additional transceiver (214f) connected. Additionally and as seen in FIG. 2, each of the transceivers 214b and 214f within controller 204 has an associated termination module (e.g., 216b and 216f, respectively).

In accordance with an example embodiment of the disclosure, by using separate transceivers in a single controller (and having one or more connectors per transceiver), a single controller can be used on multiple communication networks, with the controller functioning as an endpoint (or non-endpoint) on one or more of such communication networks. By way of example and as seen in FIG. 2, controllers 202 and 204 can be both endpoints in the CAN bus network formed between transceivers 214a and 214b (using connection between connectors 218a and 218b). However, controller 204 can also be connected to controllers 206 and 208 through an independent SK-based linear CAN bus network (e.g., formed between transceivers 214f, 214c and 214d using connectors 218f, 218c and 218d). In instances when controller 204 is coupled to controllers 206 and 208, controllers 204 and 208 are endpoints and appropriate termination resistance can be applied (e.g., using 216f and 216d).

Supporting more than two connectors on a board allows for additional boards to be added with greater ease. For example, controller board 210 (with transceiver 214e) can be added as a branched connection from the control head board 204 and as part of the SK-based CAN Bus network formed by transceivers 214f, 214c and 214d. The branched configuration of controllers comprised of multiple linear networks allows for simplicity of connecting, while each independent network can use their respective digital cable detection to determine endpoints for proper termination.

The controller boards 202-210 include corresponding microcontrollers (MC) (or a DSP) 212a-212e, transceiver modules 214a-214f, termination modules 216a-216f, and connectors 218a-218f. As seen in FIG. 2 and as explained above, the controller 204 includes two separate transceivers 214b and 214f, with a corresponding pair of connectors (218b and 218f) and corresponding termination module (216b and 216f) for each transceiver. The termination modules 216a-216f may comprise suitable circuitry, interfaces, logic and/or code and can be configured to include a detection circuit (for detecting whether one or more of the connectors associated with a transceiver are coupled to a cable), termination resistance, and a termination circuit (e.g., relay) for activating (or de-activating) the resistance based on whether or not the controller board is an endpoint (determined based on how many connections are detected by the detection circuit). In an example embodiment, other types of termination circuits can be used in lieu of a relay circuit to add or remove termination resistance (e.g., as illustrated in FIG. 3D).

Cable Detection and Self-Terminating Controllers

Figure 3A:
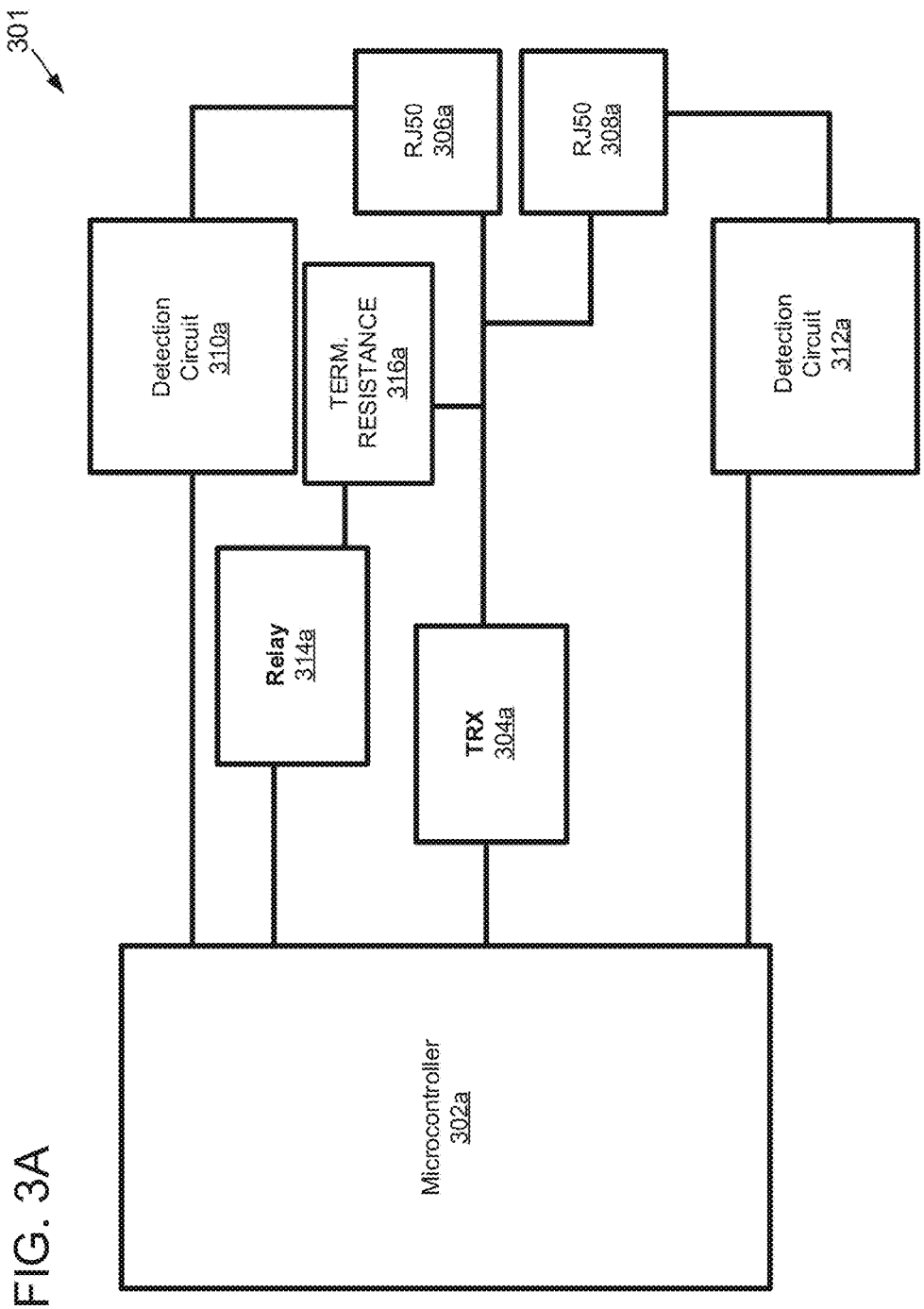
FIG. 3A is a block diagram of an example Standard K (SK)-based CAN bus controller with a plurality of connectors and corresponding detection circuits used for applying self-termination resistance, in accordance with an example embodiment of the disclosure.

FIG. 3A is a block diagram of an example SK-based CAN bus controller with a plurality of connectors and corresponding detection circuits used for applying self-termination resistance, in accordance with an example embodiment of the disclosure. Referring to FIG. 3A, the controller board 301 includes a CAN bus microcontroller 302a, a CAN bus transceiver 304a, connectors 306a, 308a, detection circuits 310a, 312a, termination resistance 316a, and a termination relay 314a. The functionalities of the microcontroller 302a and the transceiver 304a can be similar to the functionalities of the corresponding elements in the nodes of FIG. 1.

Figure 3B:
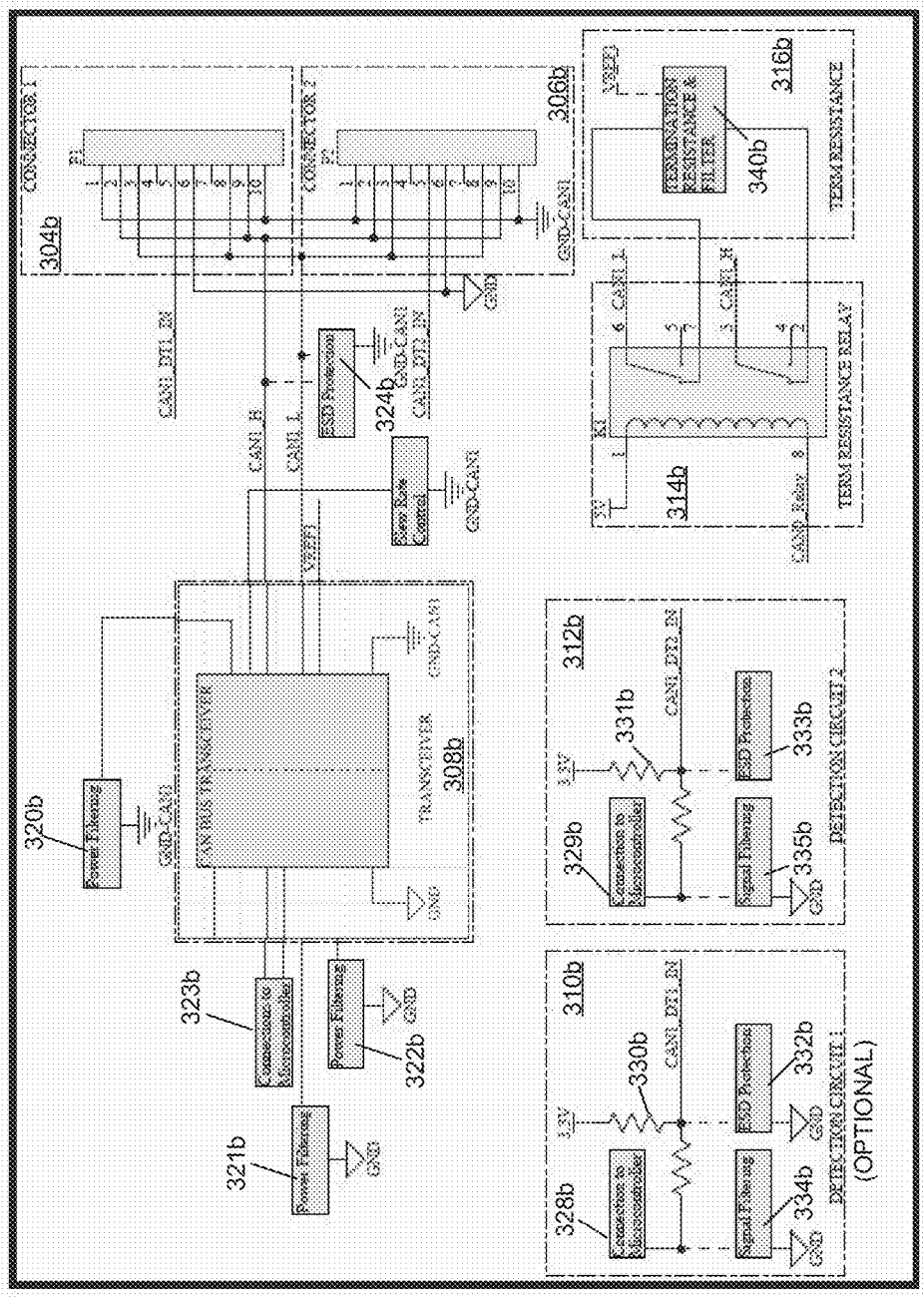
FIG. 3B is a more detailed circuit diagram of the SK-based CAN bus controller of FIG. 3A.

The detection circuits 310a, 312a, the relay 314a and the termination resistance 316a can be included as part of a termination module (e.g., 216a-216e in FIG. 2) for use in connection with digital cable detection and self-termination (e.g., in instances when the controller board is an endpoint). A more detailed diagram of the detection circuits, the relay, and the termination resistance is illustrated in FIG. 3B. The connectors 306a, 308a are illustrated as RJ50 connectors, but other types of SK-based connectors can also be used in various embodiments.

FIG. 3B is a more detailed circuit diagram of the SK-based CAN bus controller of FIG. 3A. Referring to FIG. 3B, the SK-based CAN bus controller 302b is a more detailed diagram of the SK-based CAN bus controller 301 of FIG. 3A. As seen in FIG. 3B, various pins of the transceiver 308b are connected (323b) to the microcontroller (not illustrated in FIG. 3B), power filtering 320b, 322b, connectors 304b, 306b, and electro-static discharge (ESD) protection block 324b.

Figure 3C:
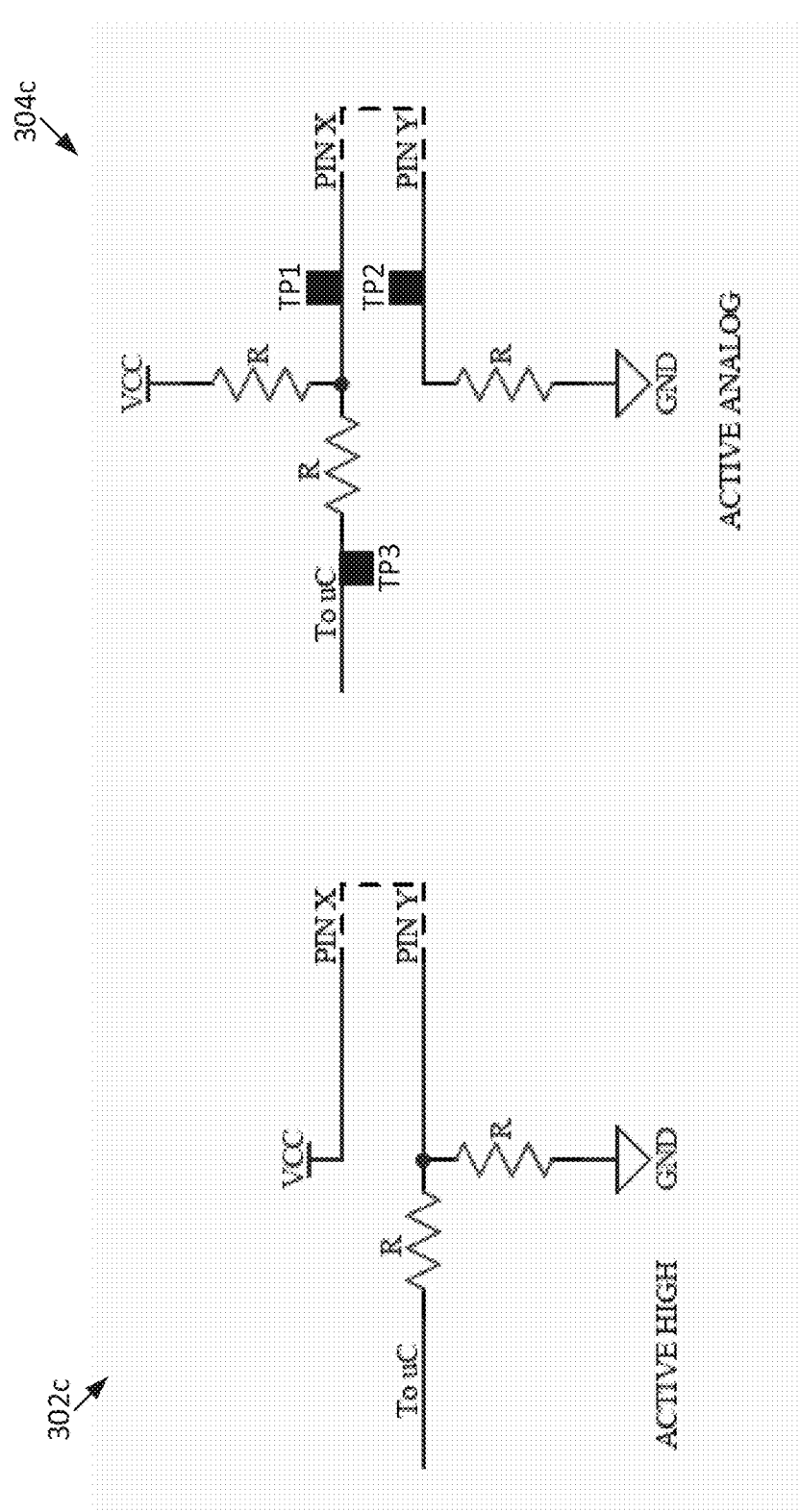
FIG. 3C illustrates additional embodiments of a detection circuit, which can be used in an SK-based controller.
Figure 3D:
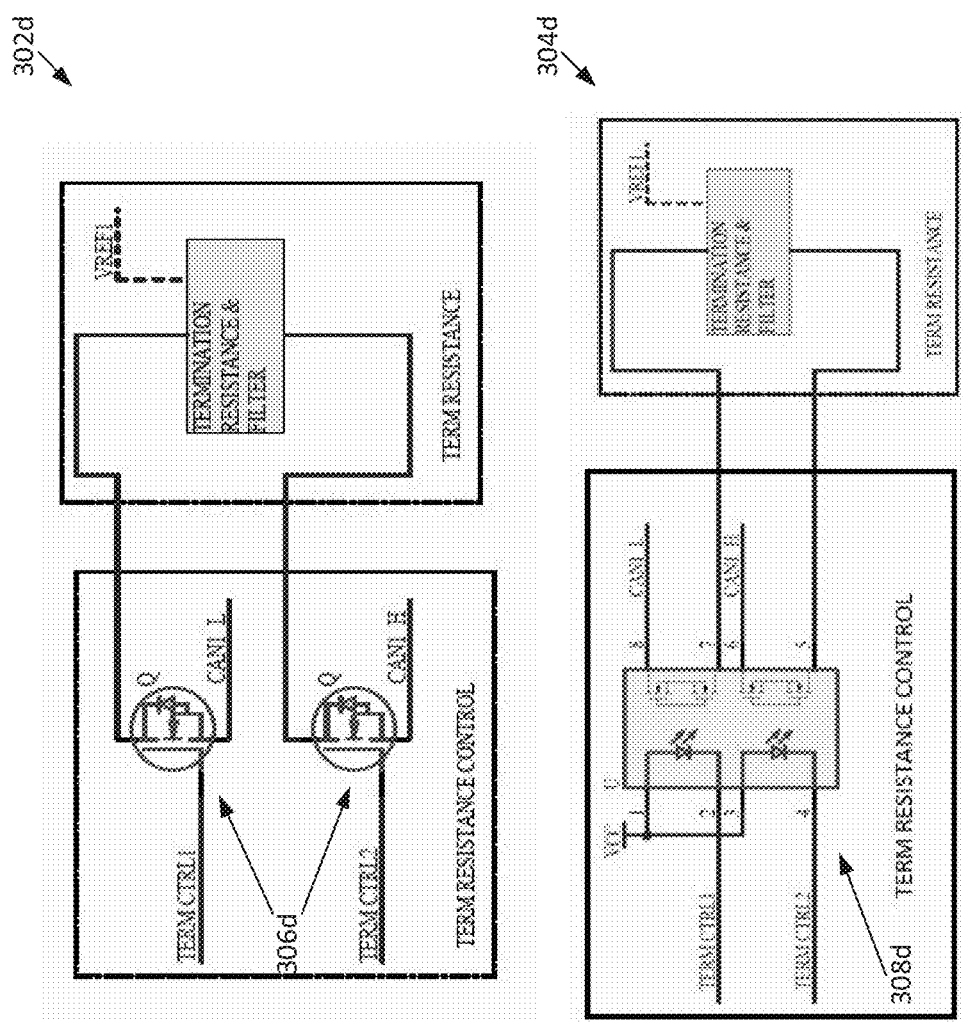
FIG. 3D illustrates embodiments of a termination resistance control block, which can be used in an SK-based controller.

Referring to FIG. 3B, the detection circuitry (e.g., 310b-312b) is isolated from the CAN bus communication and uses digital logic on each circuit board in conjunction with unique data cabling to determine if a connection is made. Additionally, the detection circuitry does not require the CAN bus communication to be operational in order to detect if a cable is present at a corresponding connector. More specifically, detection circuit 310b is associated with connector 304b, and may include a pull-up resistor 330b, ESD protection module 332b, and signal filtering module 334b. The pull-up resistor 330b pulls the CAN1_DT1_IN connection (of pin 5 at connector 304b) to, e.g., 3.3 VDC, which can be considered as a logic HIGH signal. When a cable is present at connector 304b, pin 5 is shorted to pin 6 (circuit ground), resulting in CAN1_DT1_IN being a logic LOW signal. The signal CAN1DT1_IN is filtered by the signal filtering circuit 334b and is communicated to the microcontroller via connection 328b. By detecting a logic LOW or logic HIGH signal received from detection circuit 310b, the microcontroller may determine whether there is a cable connected at connector 304b. The termination resistance can then be engaged (or disengaged) based on cable detection for both connectors 304b-306b. Even though detection circuit 310b is implemented using a pull-up resistor, other embodiments of a detection circuit can also be used (e.g., as illustrated in FIG. 3C). Additionally, even though cable detection short between pins 5 and 6 is used herein, the present disclosure is not limited in this regard and other pins can be shorted for purposes of detecting a cable and/or detecting a SJ board coupled to a SK board.

Figure 3F:
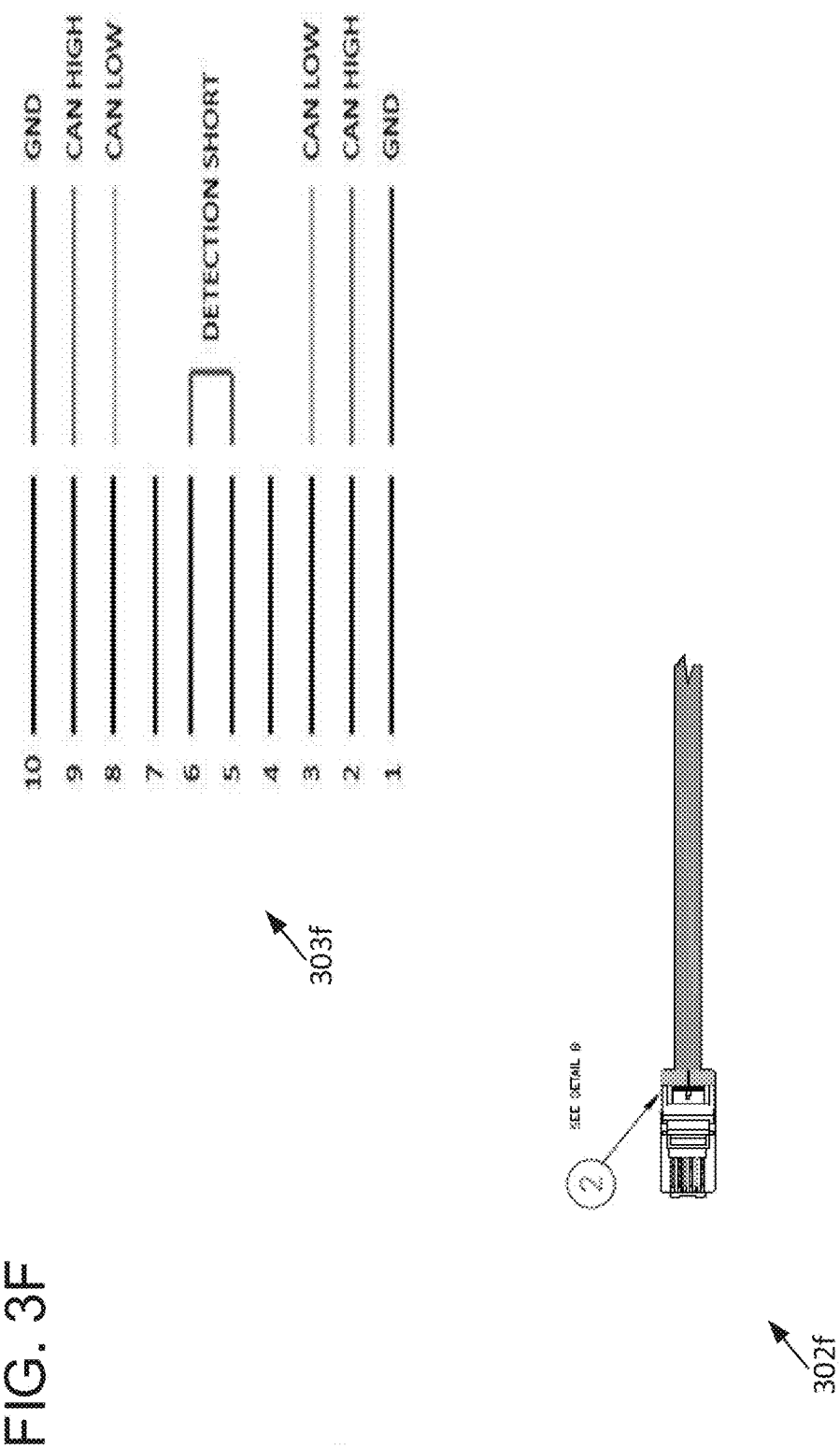
FIG. 3F is an example connector cable with a shorted pair of pins, which can be used by a CAN bus controller for cable detection and applying self-termination resistance.

Similarly, detection circuit 312b is associated with connector 306b, and includes a pull-up resistor 331b, ESD protection module 333b, and signal filtering module 335b. The pull-up resistor 331b pulls the CAN1_DT2_IN connection (of pin 5 at connector 306b) to 3.3 VDC, which can be considered as a logic HIGH signal. When a cable is present at connector 306b, pin 5 is shorted to pin 6 (circuit ground), resulting in CAN1_DT2_IN being a logic LOW signal, In order to trigger a short between pins 5 and 6 (or any other pins that are shorted and used for cable detection), a customized connecting cable can be used, where pins 5 and 6 are shorted. FIG. 3F is an example connector cable with a shorted pair of pins, which can be used by a CAN bus controller for cable detection and applying self-termination resistance. As seen in FIG. 3F, the connecting cable 302f is a 10-pin RJ50 connecting cable, where pins 5 and 6 are shorted (i.e., pins 5 and 6 are in a detection short as seen in the connection pin diagram 303d) for purposes of generating the logic LOW and HIGH signals by the detection circuits based on whether or not a connection cable is present at connectors 304b-306b.

The termination resistance relay 314b can be in a normally-closed mode (i.e., OFF) so that termination resistance 340b is provided by the termination resistance block 316b. The relay 314b is activated (i.e., it is turned ON) only when the microcontroller receives logic LOW signals (CAN and CAN1_DT2_IN) from detection circuits 310b and 312b, which indicates that cables are present at both connectors 304b-306b and the controller 302b is not an endpoint. When there are cables at both connectors (resulting in two logic LOW signals communicated to the microcontroller from detection circuits 310b-312b), the relay 314b is turned ON (e.g., via the CAN0_Relay signal from the microcontroller) and the termination resistance 340b is removed/deactivated. In an example embodiment, the termination resistance 340b used for termination in a SK-based CAN bus controller can be 99.8Ω. Other resistance values can also be used based on implementation.

In an example embodiment, the detection circuit 310b (associated with connector 304b) can be optional. The controller can be marked to indicate that the first cable is to be inserted in connector 304b associated with detection circuit 310b. A single cable connected via connector 304b will have termination resistance 316b automatically applied (316b is applied by default when the relay 314b is not activated) as the controller 302b will be an endpoint. In instances when a second cable is inserted in connector 306b, then the corresponding detection circuit 312b can detect the inserted cable and can activate the relay 314b, removing termination resistance 316b (in this case the controller 302b will not be an endpoint). As explained above, the termination resistance relay is by default OFF (closed), with active termination resistance 340b in the controller 302b. By defaulting to having the termination normally closed/connected, a termination resistance would be present on a controller board that has lost power and/or failed. In instances when the controller is an endpoint, the CAN bus communication would continue to function normally as termination resistance will be active. In instances when the controller is not an endpoint, it may still be possible for the controller to operate at various capacities (from 0 to 100%) depending upon parameters such as quantity of boards in the network, cable lengths, and other faults within the system.

In accordance with an example embodiment of the disclosure, the CAN bus SK-based cable detection may be isolated from the CAN bus communication for improved EMI performance. In reference to FIG. 3B, the bus side (communications side) of the transceiver 308b has an isolated ground from the logic (microcontroller) side. The isolated ground (referenced as GND_CAN1) is only electrically connected to the aspects of the communication bus (CAN bus). The microcontroller and remaining circuit function on a ground (indicated as GND) that is isolated from GND_CAN. This allows the circuit detection to be isolated from the communication bus ground, and allows the microcontroller to perform the detection regardless of the bus state. It can be useful that the bus does not need to be operational for the microcontroller to determine if a connection is present. In instances when a connection is present and there is no communication on the bus, the microcontroller can still enable diagnostic functions to notify a user/technician that an error is present. The relay, transceiver, and potentially other circuit board components (e.g., opto-couplers) can be used to provide isolation of the two grounds discussed above.

By using SK-based cable detection (e.g., via the detection circuits 310b-312b), network endpoints in a CAN bus network can be recognized automatically (upon insertion/removal of connection cables), and the termination resistance can be dynamically set accordingly, to maximize the system for high speed communication and multiple nodes while minimizing reflections along the communication lines. The SK-based self-terminating endpoints (e.g., controller 302b) may rely upon isolation circuitry such that the termination is put into the CAN bus communication while maintaining isolation from the processor's/board's power (circuit ground). In this regard, two power systems are used—one for communications and one for board functionality (as explained above).

FIG. 3C illustrates additional embodiments of a detection circuit, which can be used in an SK-based controller. Referring to FIGS. 3B-3C, the detection circuits 310b and 312b are generating HIGH logic signals using the pull-up resistors 330b and 331b, when there are no cables connected at connectors 304b and 306b, and active LOW log signals when cables are detected via the connection pin short (as explained above). FIG. 3C illustrates other types of detection circuits, which can be used as alternative implementation for the detection circuits 310b and 312b.

More specifically, detection circuit 302c can be used where a short between two of the connector pins of connectors 304b or 306b (e.g., pins X and Y) results in an active HIGH logic signal. The microcontroller can then keep termination resistance on the controller 302b when only one active HIGH logic signal is detected, or remove the termination resistance when two HIGH logic signals are communicated from detection circuits 310b and 312b. As used herein, the term "VCC" is an indication for the voltage of logic HIGH (typically 3.3 VDC or 5 VDC).

Circuit 304c can be used to generate active analog signal when a short between pins X and Y of a connector is detected (i.e., when a cable is inserted in a connector, triggering the short between pins X and Y). To illustrate the generation of the active analog signal, three test points (TPs) are illustrated in FIG. 3C—TP1, TP2, and TP3. Resistors R1 and R2 create a resistor divider network at TP1 and TP2 when the short is present between pin X and pin Y. The resulting voltage at TP1 and TP2 during this condition is: (Vcc*R2)/(R2+R1). If R1=R2 the resulting voltage is ½ of Vcc. In this case, the input into the microcontroller is an analog input (not a digital input), which may discern voltages between a range (e.g., ground and Vcc)

To illustrate with a specific example, if we assume Vcc=5 VDC and R1=R2 are each 10KΩ. The voltage at TP1 and TP3 will be approximately equivalent to 5 VDC (due to the pulled-up nature of R1 normally). When a short is present between pin X and pin Y, R2 is introduced into the circuit creating a resistor divider at TP1 and TP2. The voltage in this situation would result in approximately 2.5 VDC at TP1, TP2, and TP3. The microcontroller's analog input could be such that it has the following states/logic based on when is detected at TP3:

Voltage at TP3>4.5 VDC, then pins X and Y are not shorted (no CAN bus cable is present at the connectors);

Voltage at TP3 is <4.5 VDC but>3.5 VDC, then an error can be indicated;

Voltage at TP3 is 1.5-3.5 VDC, then pins X and Y are shorted (indicating that a CAN bus cable is connected); and Voltage at TP3 is <1.5 VDC, then an error can be indicated.

FIG. 3D illustrates embodiments of a termination resistance control block, which can be used in an SK-based controller. Even though FIG. 3B uses a termination resistance relay circuit 314b, other types of termination resistance add/remove control circuits can also be used. For example, FIG. 3D illustrates two other types of termination resistance control circuits. More specifically, termination resistance control circuit 302d uses a transistor control circuit (e.g., via transistors 306d) to control the termination resistance. Termination resistance control circuit 304d uses a solid state relay control circuit (e.g., via the solid state relay 308d) to control the termination resistance.

Dynamic Multi-Mode Operation

FIG. 3E is a block diagram of SK-based CAN bus controller with multi-mode self-termination resistance, in accordance with an example embodiment of the disclosure. Referring to FIG. 3E, the controller 302e can include a DSP (or microcontroller) 304e, a transceiver 306e, a connector 308e, and a multi-mode termination resistance module 309e. Even though the controller 302e is illustrated with a single connector 308e, in some embodiments more than one connectors can be used for the controller 302e.

The multi-mode termination resistance module 309e can include a relay 310e, one or more detection circuits 317e, and termination resistance 312e. In instances when multiple detection circuits are used, one detection circuit can be used for low-speed detection (e.g., detection of a connected SJ controller) and another detection circuit can be used for high-speed detection (e.g., detection of a connected SK controller). In accordance with an example embodiment of the disclosure, the detection circuit 317e within the multi-mode termination resistance module 309e can be configured to recognize/determine that the controller 302e is connected to a SJ-based CAN bus controller or a SK-based CAN bus controller. In this regard, if the connector 308e is connected to a SJ-based CAN bus controller, the multi-mode termination resistance module 309e can detect the connection to a SJ-based CAN bus controller and can activate the SJ-based termination resistance 316e, thereby dynamically reconfiguring the controller 302e as a SJ-based CAN bus node. Similarly, if the connector 308e is connected to a SK-based CAN bus controller, the multi-mode termination resistance module 309e can detect the connection to a SK-based CAN bus controller and can activate the SK-based termination resistance 314e, thereby dynamically reconfiguring the controller 302e as a SK-based CAN bus node.

The detection circuit 317e can be configured to perform one or more types of detection, such as low-speed cable detection (e.g., detection of a SJ controller) and high-speed detection (e.g., detection of a SK controller). During cable detection, the detection circuit 317e can detect whether or not a cable is connected to the connector 308e. For example, the detection circuit 317c can detect a short between two of the connector pins in order to determine a cable is connected to connector 308e. During SJ-based detection, the detection circuit 317e can detect a short between pins that are different from the pins used for the cable detection short.

FIG. 4F is a diagram of an example hybrid connector cable, which can be used to connect SK-based and SJ-based CAN bus controllers. As seen in FIG. 4F, the connector cable may be a RJ50 (10-pin) connector on one side and may be a RJ12 (6-pin) connector on the other side. The 6-pin connection can be used for connecting to a SJ-based CAN bus controller, and the 10-pin connector can be used to connect to a SK-based CAN bus controller. FIG. 4F also illustrates two different shorted pairs of pins at the 10-pin connector. A first shorted pair of pins includes the connection between pins 5 and 6, which is used to detect a cable. A second pair of shorted pins includes the connection between pins 4 and 7, which can be used to detect connection to a SJ-based CAN bus controller. Even though the connector cable 400f is illustrated as a 10-pin RJ50 to 6-pin RJ12 connector cable, other types of connectors with different pin number and pin configurations can be used as well. For example, a first type of connector can be used on one end of the cable for connecting to a SJ board, and a second type of connector can be used on the other end of the cable for connecting to a SK controller.

Referring again to FIG. 3E, the detection circuit 317e can detect that a cable is detected at connector 308e based on the detection short of pins 5 and 6. If there is no SJ-based detection (e.g., of pins 4 and 7), then SK-based termination resistance 314e is activated since the node is a SK-based CAN bus endpoint. If a short is detected between pins 5-6 as well as pins 4-7, then only the SJ-based termination resistance 316e is activated since the node 302e is a SJ-based CAN bus endpoint. A hybrid cable 400f (FIG. 4F) can be used to connect a SK-based connector (e.g., 308e) to a SJ-based controller board (e.g., with a SJ-based RJ12 connector). As seen in FIG. 4F, the left side of cable 400f uses a 10-pin connector and the right side of cable 400f uses a 6-pin connector. The specific pin connection shorts for the 10-pin connector and how the 10 pins from the left side of cable 400f are connected to the 6 pins of the right side of cable 400f are illustrated in the pin diagrams 402f.

In accordance with an example embodiment of the disclosure, the controller 302e can default to a SK-based termination resistance (e.g., resistance 314e is present/active by default). In this case, the detection circuit 317e can be used to detect a SJ-based controller, and upon detection of a SJ-based controller, to remove the high-speed (SK-based) termination resistance 314e and add the low-speed (SJ-based) termination resistance 316e.

In this regard, the above described functionality of the multi-mode termination resistance module 309e provides compatibility between new (using, e.g., SK-based CAN bus controllers) and old products (using, e.g., SJ-based CAN bus controllers), meaning that customers do not need to replace all modules when they upgrade or add just one or a few modules to existing dental equipment networks. Also, it means that a dental equipment manufacturer does not need to update all modules to include SK-based CAN bus controllers, which would be costly.

Multi SIC-Based Networked System

Figure 3G:
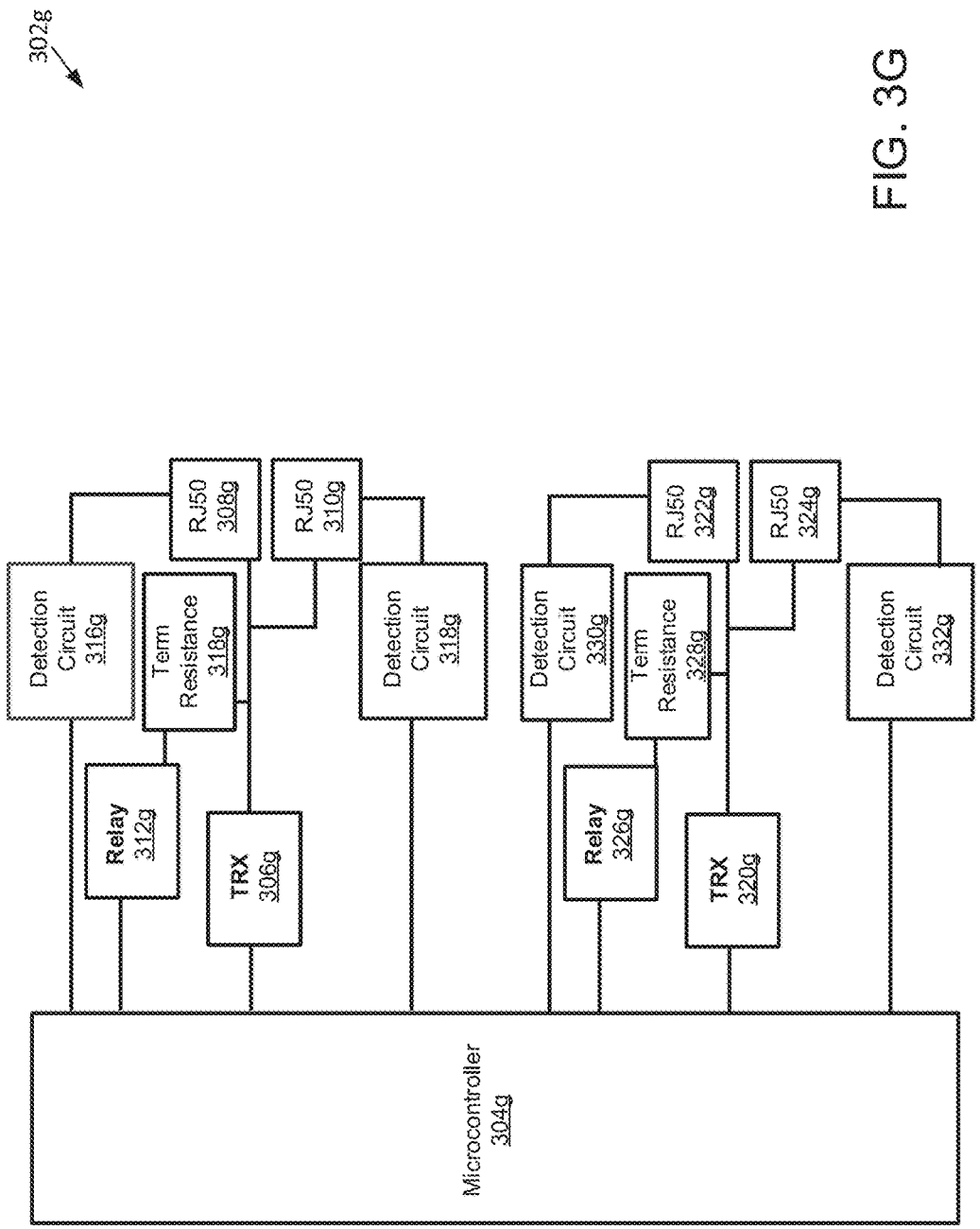
FIG. 3G is a block diagram of another example SK-based CAN bus controller with a plurality of connectors and corresponding detection circuits used for applying self-termination resistance, in accordance with an example embodiment of the disclosure.

FIG. 3G is a block diagram of another example SK-based CAN bus controller with a plurality of connectors and corresponding detection circuits used for applying self-termination resistance, in accordance with an example embodiment of the disclosure. Referring to FIG. 3G, the SK-based CAN bus controller 302g can include a microcontroller 304g coupled to two sets of connectors (308g/310g and 322g/324g). The first set of connectors (308g/310g) is coupled to a transceiver 306g, a relay circuit 312g, termination resistance 318g, and detection circuits 316g-318g. The second set of connectors (322g/324g) is coupled to a transceiver 320g, a relay circuit 326g, termination resistance 328g, and detection circuits 330g-332g. The functionalities of the detection circuits, relay circuit, and termination resistance are similar to the functionalities described herein above for similar modules. Even though connectors 308g, 310g, 322g, and 324g are illustrated as RJ50 connectors, other type of connectors can be used as well (e.g., a hybrid low/high speed CAN bus controller with a communications bridge is illustrated in reference to FIG. 4B).

In accordance with an example embodiment of the disclosure, the multi-connector/multi-transceiver controller 302g can be used in a SK-based CAN bus system with a plurality of SK-based CAN bus networks. The utilization of multiple networks allows for a greater number of connection points on each circuit board, while maintaining the able detection and self-terminating endpoint functionalities described herein. The presence of multiple networks (e.g., one SK-based. CAN bus network can be coupled to connectors 308g/310g, and another network can be coupled to connectors 322g/324g) allows for simpler wiring and more flexible integration. The presence of multiple networks allows for circuit boards to include one, two, or any plurality of connections, enabling dental equipment to be physically connected by cables in branched configurations. An added benefit of this approach is that if one network malfunctions, the remaining networks can continue to function. Also, multiple networks linked by boards (such as the multi-connector controller board 302g) with more than two connections enables a plurality of networks connecting a plurality of nodes (even though the number of nodes may be limited on each individual network).

FIG. 4A is a diagram of a hybrid dental equipment network using SJ-based, SK-based and hybrid CAN bus controllers connected in a branched configuration, in accordance with an example embodiment of the disclosure. Referring to FIG. 4A, the hybrid dental equipment network 400a is a branched network that includes SK-based CAN bus controllers (e.g., 414a-416a), SJ-based CAN bus controllers (e.g., 402a-406a) and hybrid CAN bus controllers (e.g., 408a-412a). The SJ-based CAN bus controllers use RJ12 connectors, the SK-based CAN bus controllers use one or more RJ50 connectors, and the hybrid CAN bus controllers use one or more RJ50 connectors (for connection to another SK-based controller) and/or one or more RJ12 connectors (for connection to a SJ-based CAN bus controller). For example, the hybrid CAN bus controller 410a includes four SK-based connectors and two SJ-based connectors. The SK-based connectors can be used for connection to another SK-based CAN controller (e.g., using connector cable such as 302f). In an example embodiment, a single connector SK-based CAN bus controller (e.g., 414a) can be connected to a SJ-based CAN bus controller (e.g., 406a) using a hybrid connection cable, such as 400f (FIG. 4A illustrates 414a connected to 412a; however, 414a can instead be connected to 406a and the potential connection is illustrated with a dotted line). In instances when a hybrid controller (e.g., 410a) has both SK-based (e.g., RJ50) and SJ-based connectors (e.g., RJ12) (each set of connectors having a separate transceiver), then such controller can be coupled to another SJ-based controller (using RJ12-to-RJ12 connecting cable) or to another SK-based controller (e.g., using the 302f connecting cable with shorted pins to enable cable detection).

Communications Bridge

Figure 4B:
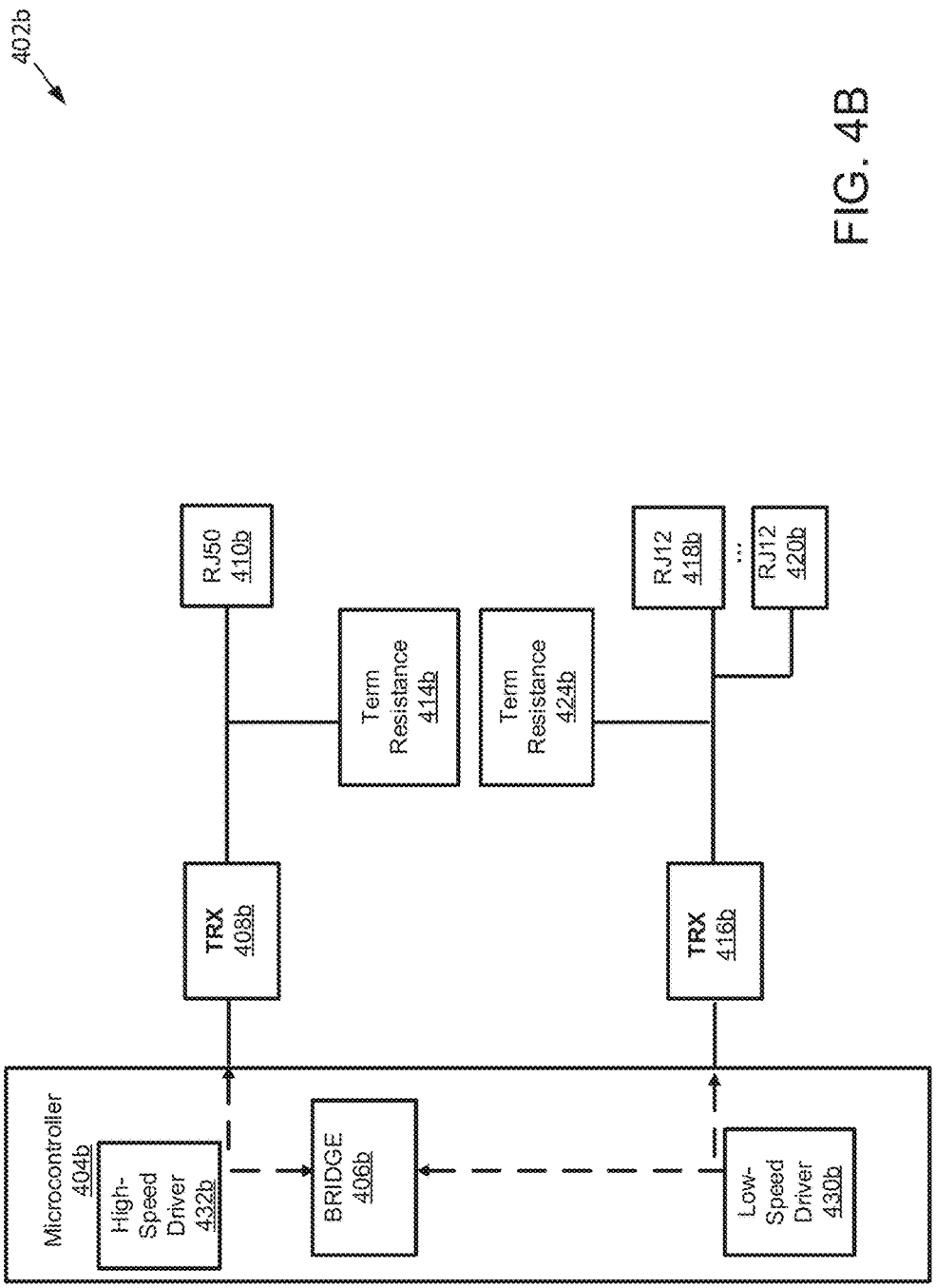
FIG. 4B is a block diagram of an example hybrid CAN bus controller with termination resistance and a communications bridge for performing communications between SK-based and SJ-based CAN bus networks, in accordance with an example embodiment of the disclosure.

FIG. 4B is a block diagram of an example hybrid CAN bus controller with termination resistance and a communications bridge for performing communications between SK-based and SJ-based CAN bus networks, in accordance with an example embodiment of the disclosure. Referring to FIG. 4B, the hybrid CAN bus controller 402b includes a microcontroller 404b, a SK-based connector 410b) (e.g., RJ50) coupled to transceiver 408b, and termination resistance 414b. The CAN bus controller also includes SJ-based connectors (e.g., RJ12) 418b-420b coupled to transceiver 416b, and termination resistance 424b.

As seen in FIG. 4B, in instances when a single SK-based connector (e.g., 410b) is used, then no relay is needed as the termination resistance 414b will always be activated (since a single 5K-based connector is used, then the SK-based CAN bus controller 402b using transceiver 408b will be used as an endpoint). Additionally, each of the SJ-based. CAN bus connectors (418b, 420b) associated with transceiver 416b may be terminated by resistance 424b, which will also not require the use of a relay. In this regard, a relay module and a corresponding detection circuit can be used optionally, in instances when more than one SK-based connectors are used for a SK-based. CAN bus in a given controller.

In accordance with an example embodiment of the disclosure, the microcontroller 404b can provide bridging functions using a bridge 406b. The bridge 406b may comprise suitable circuitry, interfaces, logic and/or code and can be configured to perform data transfer of SJ-based communication (e.g., received via one or more of the SJ-based connectors and transceiver 416b) to be broadcast on a SK-based bus (e.g., via the transceiver 408b and the connector 410b) and vice versa. The bridging functions provided by the bridge 406b allow for the interoperability of SJ-based devices (e.g., devices coupled to the SJ-based connectors 418b-420b) and SK-based devices (e.g., devices coupled to the SK-based connector 410b).

One or more of the bridging functions associated with the bridge 406b can be provided by a SJ-based driver 430b (associated with a SJ-based CAN bus network coupled to the controller 402b via the SJ-based connectors 418b-420b) and a SK-based driver 432b (associated with a SK-based CAN bus network coupled to the controller 402b via the SK-based connector 410b). In accordance with an example embodiment of the disclosure, the bridge 406b, the SJ-based driver 430b and the SK-based driver 432b can be implemented on the microcontroller as firmware or other types of software, as part of the communication protocol used in one or more of the CAN bus networks described herein. For example, the bridge 406b can be responsible for translating SJ-based CAN bus messages (received by the transceiver 416b) and associated protocol logic into equivalent SK-based communication signals for communication via the transceiver 408b, and vice-versa. The SK-based driver 432b and the SJ-based driver 430b can receive all bridged signals (e.g., signals received from the transceiver 416b and translated by the bridge 406b), as well as other signals needed to support internal software running on one or more components of the controller 402b.

The bridging functionalities performed by the bridge 406b can include, e.g., a communications protocol translation. The translation process performed by the bridge 406b can include receiving one or more SJ-based CAN bus messages (via transceiver 416b), interpreting the messages to generate an intended action, and then translate the action into a corresponding SK-based CAN bus message which can be communicated via the transceiver 408b. A similar translation process takes place when at least one SK-based CAN bus message is received from the transceiver 408b and a corresponding message is generated by the bridge 406b and communicated via the transceiver 416b. The following is an example of a message translation, which can be performed by the bridge 406b. In this example a message to change the state of a dental light from on to off originates at a SJ-based touchpad, is received and translated by a bridge, and is then sent to a SK-based dental light, which executes the message:

| SJ-based Device (e.g., Touchpad) | SJ<-->SK Translation | SK-based Device (e.g., Dental Light) |
|---|---|---|
| | (Based on previous system activity, this device's internal knowledge of "dental light state" is already set to "ON".) | |
| Send CAN ID 0x12 once every 40 milliseconds as long as the dental light button is depressed, | Receive CAN ID 0x12 and initiate a timer to keep track of how much time has elapsed since receipt of this first 0x12 message, (This timer will stop 100 milliseconds after the most recent 0x12 message is received.) | |
| Continue sending 0x12 . . . | Timer continues running since a new 0x12 message arrives before the 100 millisecond timeout value. | |
| . . . | . . . | |
| . . . | Once the internal timer exceeds 1 second, this device's internal knowledge of "dental light state" is updated to "OFF". Send the appropriately constructed SK header message (identifying the sending device, signal identifier, | Receive SK header message. Prepare to receive the updated dental light state data value. |

-continued

| SJ-based Device (e.g., Touchpad) | SJ<-->SK Translation | SK-based Device (e.g., Dental Light) |
|---|---|---|
| | receiving device(s), and subsequent number of SK data messages needed to communicate the dental light state change). | |
| . . . | (Asynchronous to the incoming 0x12 messages) Send the SK data message(s) needed to transmit the dental light state's data value corresponding to "OFF". | Received SK data message(s), updating my internal "dental light state" data value to "OFF". |
| . . . | Internal timer still running since new 0x12 messages continue to arrive. | |
| User releases dental light button. Stop sending 0x12 messages. | 100 milliseconds after receipt of this last 0x12 message, reset the internal timer so any new 0x12 messages received will be interpreted as a new dental light button activation. | |

Example Multi-Connector CAN Bus Controllers

Figure 4C:
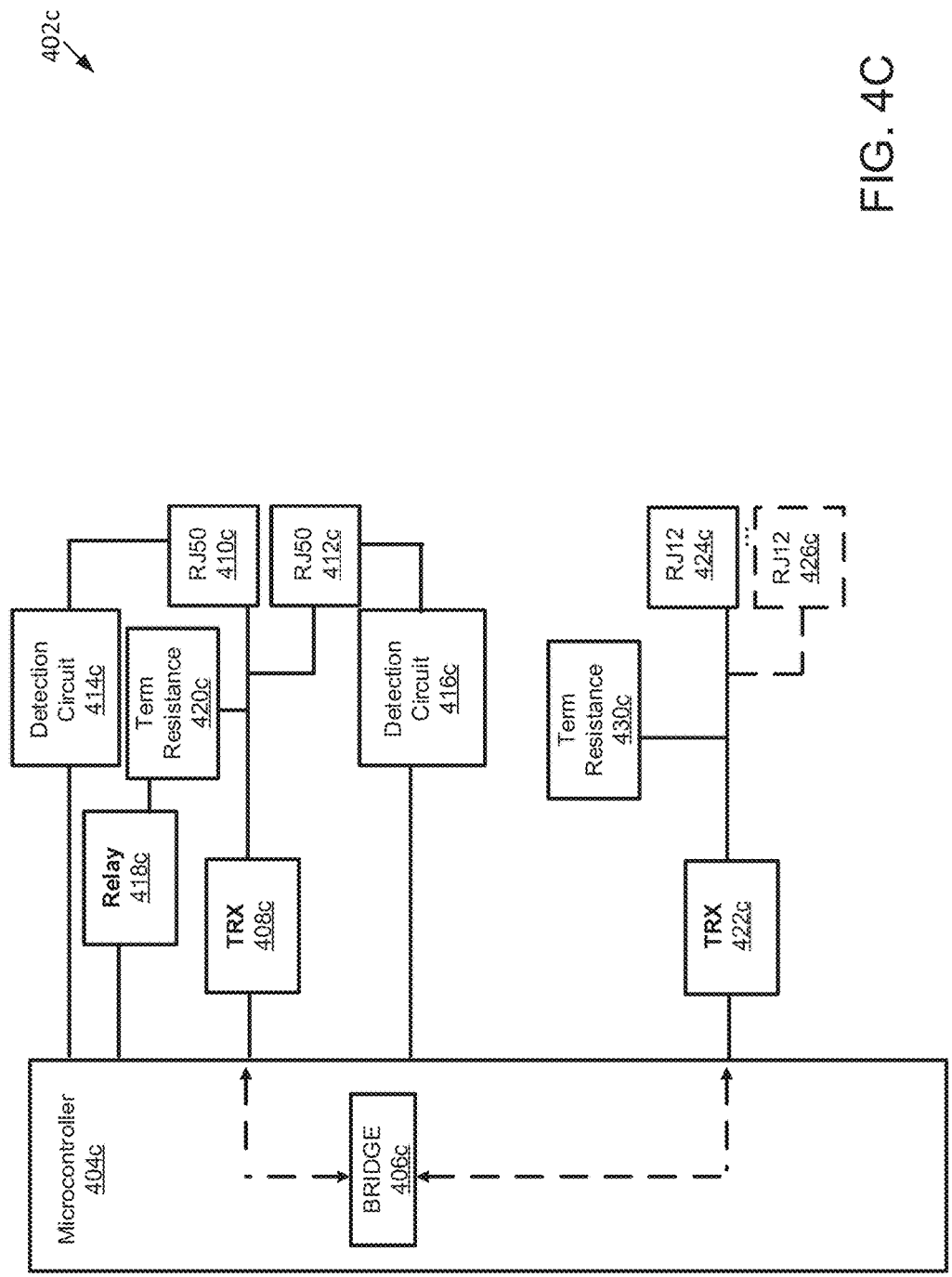
FIG. 4C is a block diagram of another example hybrid CAN bus controller with self-termination resistance and a communications bridge for performing communications between SK-based and SJ-based. CAN bus networks, in accordance with an example embodiment of the disclosure.

FIG. 4C is a block diagram of another example hybrid CAN bus controller with self-termination resistance and a communications bridge for performing communications between SK-based and SJ-based CAN bus networks, in accordance with an example embodiment of the disclosure. Referring to FIG. 4C, the hybrid CAN bus controller 402c is similar in many respects to the hybrid. CAN bus controller 402b (FIG. 4B), except that the controller 402c includes multiple SK-based connectors (e.g., RJ50 connectors 410c-412c). More specifically, the hybrid CAN bus controller 402c includes a microcontroller 404c, SK-based connectors 410c-412c (e.g., RJ50) coupled to transceiver 408c, relay 418c, termination resistance 420c and detection circuits 414c, 416c. The CAN bus controller 402c also includes one or more SJ-based connectors (e.g., RJ12) 424c-426c coupled to transceiver 422c and termination resistance 430c. The termination resistance 430c is used to terminate transceiver 422c associated with the one or more SJ-based connector 424c-426c (connector 426c is illustrated with a dashed line in FIG. 4C to indicate that it is optional). The microcontroller 404c can also include a bridge 406c, which may have functions similar to the bridge 406b (FIG. 4B).

Figure 4D:
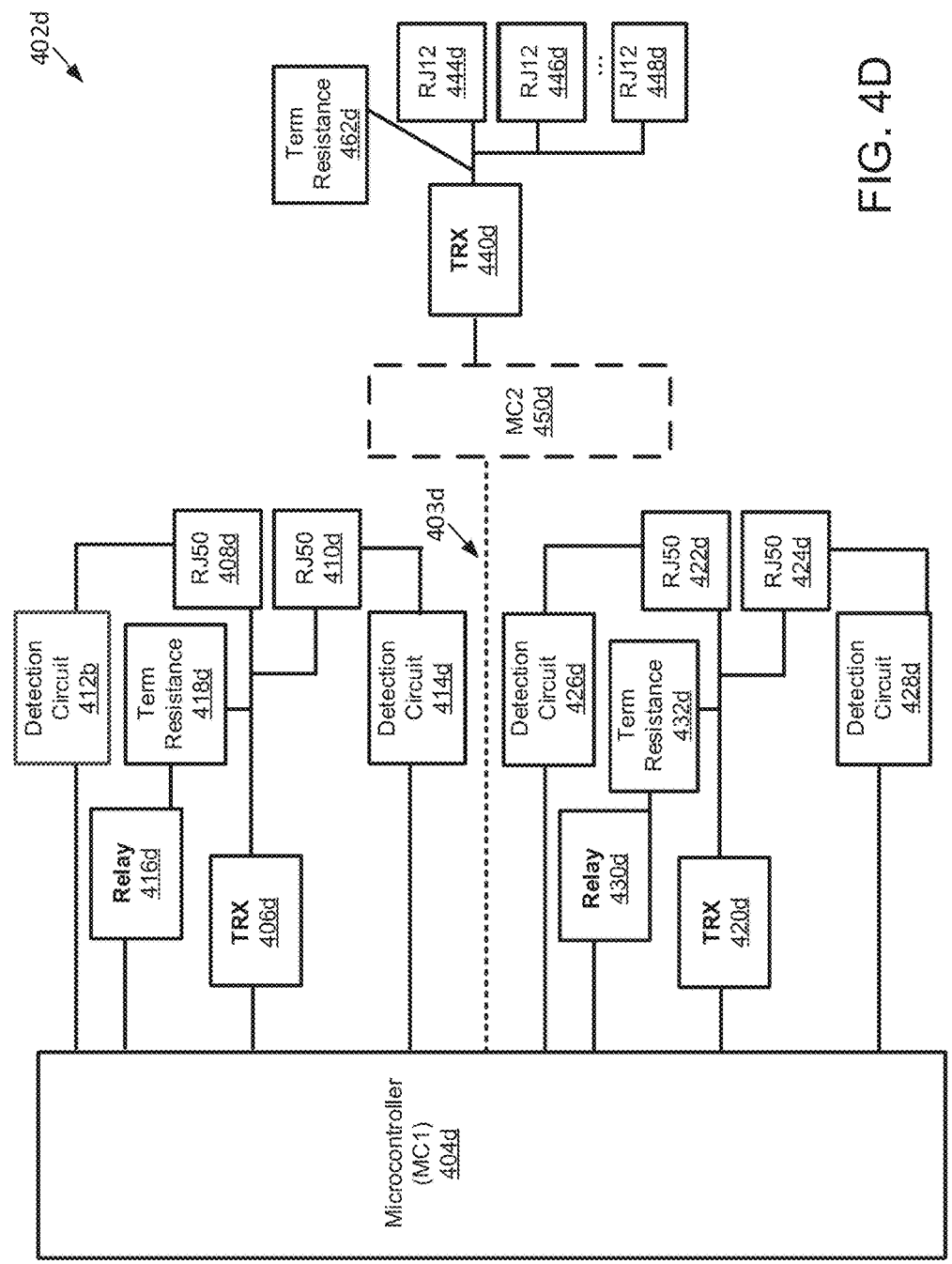
FIG. 4D is a block diagram of an example hybrid CAN bus controller with self-termination resistance and a plurality of SK-based and SJ-based connectors coupled to separate microcontrollers, in accordance with an example embodiment of the disclosure.

FIG. 4D is a block diagram of an example hybrid CAN bus controller with self-termination resistance and a plurality of SK-based and SJ-based connectors coupled to separate microcontrollers, in accordance with an example embodiment of the disclosure. Referring to FIG. 4D, the SK-based CAN bus controller 402d includes a microcontroller 404d, a first set of SK-based connectors 408d-410d (e.g., RJ50) coupled to transceiver 406d, relay 416d, termination resistance 418d and detection circuits 412d-414d. The controller 402d also includes a second set of SK-based connectors 422d-424d (e.g., RJ50) coupled to transceiver 420d, relay 430d, termination resistance 432d and detection circuits 426d-428d.

In accordance with an example embodiment of the disclosure, the controller 402d may also comprise an additional transceiver 440d, where the transceiver is associated with one or more SJ-based. CAN bus connectors, such as the RJ12 connectors 444d-448d. Additionally, the microcontroller 404d can include a bridge (e.g., similar to 406c), which can be used to "translate" communications between at least one SJ-based CAN bus (e.g., communications from/to any of the SJ-based connectors 444*d*-448*d*) and at least one SK-based CAN bus (e.g., communications from/to any of the SK-based connectors 408*d*-410*d* and 422*d*-424*d*).

In yet another example embodiment, the controller 402*d* can include a second microcontroller 450*d*, which can be coupled to the SJ-based transceiver 440*d* and can be used to process SJ-based CAN bus communications to/from one or more other CAN bus devices coupled to controller 402*d* via at least one of the SJ-based connectors 444*d*-448*d*. In instances when a second (dedicated) microcontroller 450*d* is used to handle SJ-based communications, a bridge may be located within the microcontroller 404*d* or 450*d*. Microcontrollers 404*d* and 450*d* are connected via communication link 403*d* (wired and/or wireless connection) for sharing information between the two. In this regard, there can be communication bridges in 404*d* and 450*d* to handle communication between microcontrollers 404*d* and 450*d*. While not depicted, it is easy to envision how the second microcontroller could instead be coupled to another SK-based transceiver for processing SK-based CAN bus communications to/from one or more other CAN bus devices coupled to controller 402D via one or more SK-based connectors.

Figure 4E:
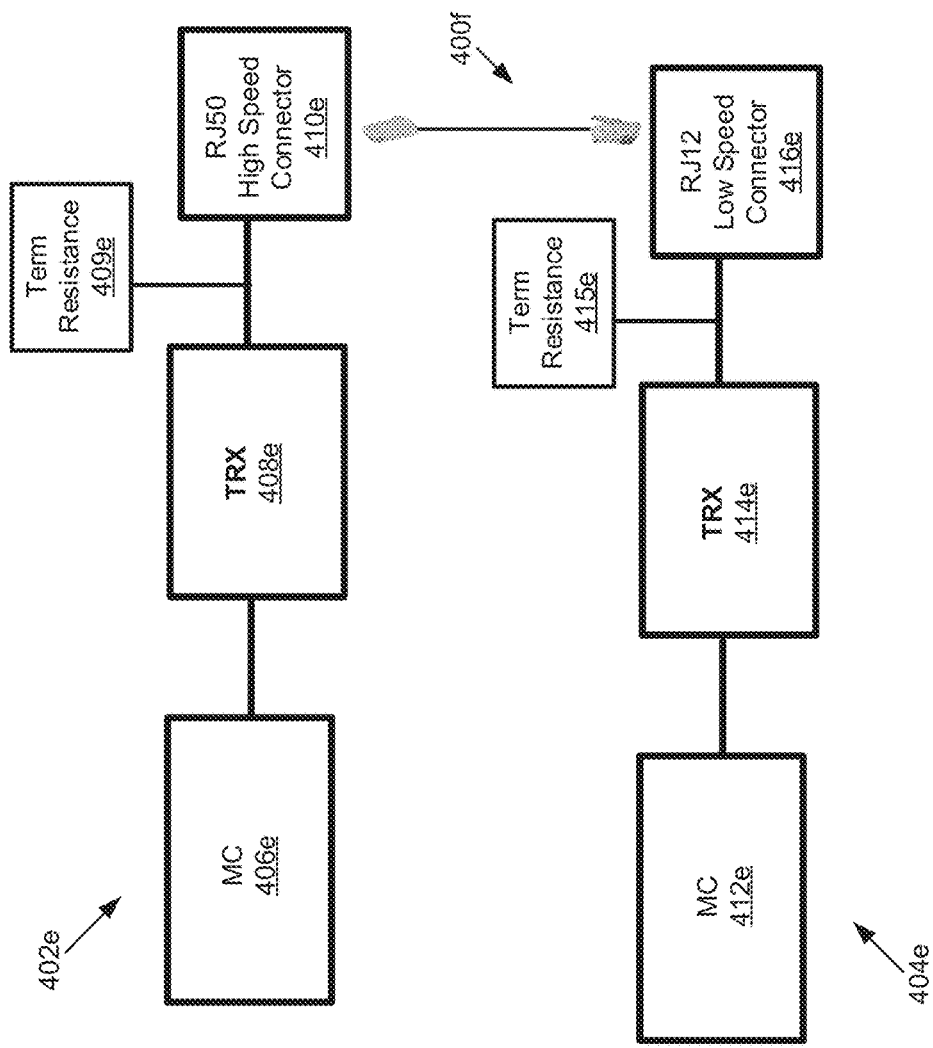
FIG. 4E is a block diagram of a SK-based CAN bus controller coupled to a SJ-based CAN bus controller using a hybrid connector cable.

FIG. 4E is a block diagram of a SK-based CAN bus controller coupled to a SJ-based CAN bus controller using a hybrid connector cable. FIG. 4F is a diagram of an example hybrid connector cable, which can be used in connection with FIG. 4E. Referring to FIG. 4E, a SK-based CAN bus controller 402*e* can include a microcontroller 406*e*, a transceiver 408*e* and a SK-based connector 410*e*. A SJ-based CAN bus controller 404*e* can include a microcontroller 412*e*, a transceiver 414*e* and a SJ-based connector 416*e*. Termination resistance 409*e* and 415*e* can be associated with transceivers 408*e* and 414*e*, respectively. The controllers can also include additional modules, such as detection circuits, as described herein above. The SK-based controller 402*e* can be the same as the controller 302*e* in FIG. 3E, using a multi-mode termination resistance module 309*c*. In this regard, hybrid connector cable 400*f* (FIG. 4F) can be used to connect the SK-based controller to the SJ-based controller 404*e*, and automatically provide SJ-based termination resistance (e.g., using the connection short between pins 5/6 and 4/7, as explained herein above).

Example Processing Flow Using a Hybrid Cable Connection

Figure 5:
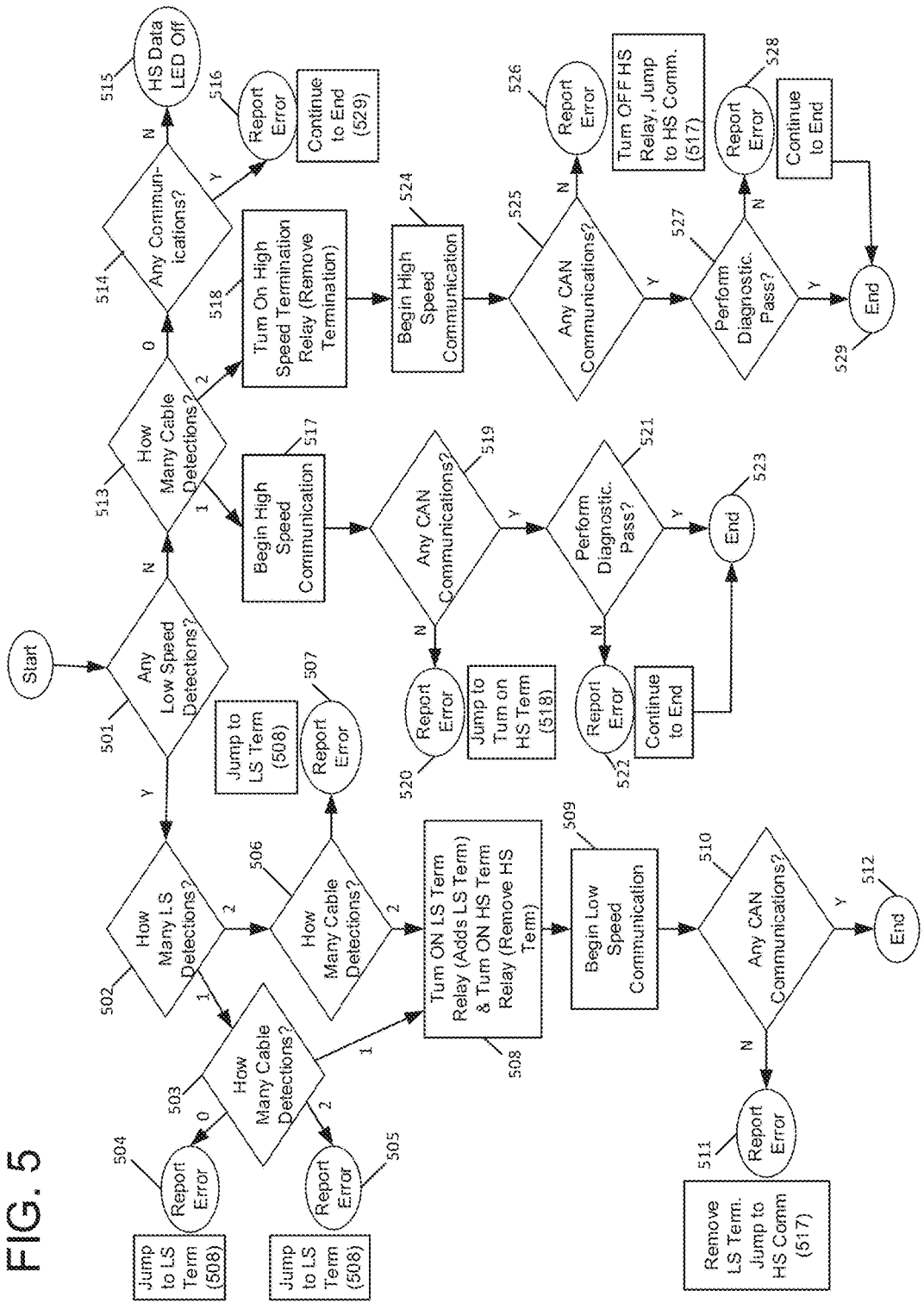
FIG. 5 is an example flow diagram of a method for endpoint detection and automatic self-termination for a SK-based CAN bus controller, in accordance with an example embodiment of the disclosure.

FIG. 5 is an example flow diagram of a method for endpoint detection and automatic self-termination for a hybrid CAN bus controller, in accordance with an example embodiment of the disclosure. Referring to FIGS. 3A and 5, the example method may start at 501, when it is determined whether any SJ-based detections exist at connectors 306*a* and 308*a* (e.g., of at least one SJ-based controller coupled to a SK-based (HS) connector via a cable 400l). If there is a SJ-based detection by 310*a* and/or 312*a* (e.g., by detecting a short between pins 4 and 7 in one or more cable connected at 306*a*-308*a*), then at 502, it is determined how many SJ-based (LS) detections there are associated with cable connections at 306*a*-308*a*.

If two LS detections are detected, then at 506 it is determined how many cables at 306*a*-308*a* are detected (e.g., by detecting a short between pins 5 and 6 of a connector cable). If 0 or 1 cables are detected, then an error is reported (at 507), and processing resumes at LS termination activation at 508.

In an example embodiment, the controller 301 (FIG. 3A) can include a multi-mode termination resistance module such as 309*e* (FIG. 3E). If at 506 two cables are detected (i.e., the controller is coupled to two LS controllers via the HS connectors 306*a*-308*a* and using hybrid cables such as 400*f*), then processing continues at 508, when LS termination resistance (e.g., 316*e* in FIG. 3E) is turned ON (i.e., termination resistance is added by turning ON relay 310*e*), and a HS termination relay is also turned ON (removing the HS termination resistance 314*e*). A single relay (e.g., 310*e*) can be used to perform the add/remove functionalities at the same time (e.g., removing the HS termination resistance automatically adds the LS termination resistance). At 509, LS communication can begin. At 510, it is determined whether there are any CAN bus communications present. If there are, process ends at 512, and if there are not, an error is reported at 511 and an attempt at HS communication processing can be initiated at 517 (after LS termination is removed).

If one LS connection is detected at 502, the number of cable detections can be determined at 503. If zero cables are detected, an error is reported at 504 and processing resumes at LS termination at 508. If two cables are detected, then an error is reported at 505 and processing resumes at LS termination at 508. If one cable is detected at 503, then processing resumes at LS termination at 508.

If at 501 no LS connections are detected, at 513 it is determined how many cables are detected (e.g., by detection a short between pins 5 and 6 of a SK-based connector). If one cable is detected at 513, processing continues at 517, when HS communication can begin (with HS termination resistance applied). At 519, it is determined whether any CAN bus communications are taking place. If there are no communications, then an error is reported at 520 and processing can continue at 518. If CAN bus communications are detected, diagnostics can be performed at 521. If the diagnostics pass, processing ends at 523. If the diagnostics fail, an error is reported at 522 and processing ends at 523.

If at 513 there are two cables detected, then at 518, the HS termination relay (e.g., 416*d* or 430*d*) is turned ON (thereby removing HS termination resistance). At 524, HS communication can begin. At 525, it is determined whether there is any CAN bus communication. If there are no CAN bus communications, an error is reported at 526, HS termination relay is turned OFF, and processing continues at 517. If there are CAN bus communications present, diagnostics can be performed at 527. If the diagnostics pass, processing ends at 529. If the diagnostics fail, an error is reported at 528 and processing ends at 529.

If no cables are detected at 513, it can be determined (at 514) whether there are any communications. If any communication is detected, an error is reported at 516 and processing ends at 529. If no communications are detected at 514, a HS data indicator (e.g., an LED) can be turned OFF.

Communication Protocol

General Overview of Challenges Addressed by the Communication Protocol

In an example embodiment, a CAN bus device network (e.g., as illustrated in FIG. 2 or FIG. 4A) can be based on a mix-and-match product strategy resulting in a non-deterministic device topology. Since there is no guarantee that any one device will be present on the communications network, a master-slave communication protocol is not feasible in a CAN bus device network. The data requirements for each device on the network may vary, and the type of data communicated within the CAN bus network depends on the installed set of devices (i.e., a dental chair, a dental light, a clinical device, a user interface, and so forth). Therefore, the CAN bus communication protocol supports the exchange of arbitrary data between a non-deterministic (and possibly dynamic) set of networked devices.

In an example embodiment, data exchanged between devices in a CAN bus communication network can fall into one of three categories, based on the type of data being sent: unicast, multicast, and broadcast. Unicast (one-to-one) communication is required, for example, during software update operations. In some networks, there can be more than one instance of a particular device connected to the same network. To ensure robust reprogramming operation, the communication protocol can support autonomous programming/software update functions where each connected device is updated separately. Multicast (one-to-multiple) communication can be used to reduce bus bandwidth by having multiple devices receive the same data update. In this case, the data is only transmitted once and each intended recipient is identified in the communicated message(s). Finally, broadcast (one-to-all) communication can be used when a device "blindly" sends data on the network without explicitly knowing (or identifying) the recipients. This type of communication can be used during, e.g., auto-discovery.

In an example embodiment, more than one user interface can be provided to control the functionalities of one or more devices within a CAN bus device network. For example, the state of a dental light may be changed directly on the light itself, by pressing a button on the Assistant's user interface, pressing a button on the Dentist's user interface, or the state may change automatically when the dental chair arrives at a preprogrammed "treatment" position. In this regard, data "race conditions" may exist within the network when multiple devices simultaneously generate updated data values, especially when processing and transport delays are considered. The communication protocol, therefore, includes functionalities to de-conflict "simultaneous" data updates.

In instances of some legacy CAN bus networks, the communication protocol used may require modification for every new device that is added. Additionally, communication protocols in legacy CAN bus networks can use CAN messages with fixed meaning/interpretation when the legacy protocol focuses on driving functionality rather than communicating data. This approach, however, can be undesirable since there is no clear separation of responsibility within the software between the device's application logic (functionality) and the CAN bus communication driver (data exchange), which results in a tightly coupled body of software that is difficult to test and modify. In an example embodiment, a CAN bus communications protocol can focus on communicating data, which defers the means of implementing functionality to the application software of each respective device. Additionally, the CAN bus communications protocol disclosed herein supports a standardized plug-n-play capability that allows each device to be notified when another device either connects or disconnects from the network, and provides a means for each of the networked devices to be uniquely identified, with minimal transport latency of the exchanged messages. In this regard, the communication protocol can be used in connection with CAN bus networks ranging from resource-constrained "bare metal" devices (e.g., devices with no operating system) to devices running consumer or specialized operating systems (i.e. Windows, Linux, Mac OS, iOS, Android, FreeRTOS, VxWorks, etc).

The type of data sent and functionality implemented within a CAN bus communication network can change over time. For example, a single CAN bus device network can include devices with differing vintages and supporting differing communication protocols. In an example embodiment, the CAN bus communication protocol disclosed herein unambiguously identifies every piece of data using a mechanism that will not change (purposefully or accidentally) over time. Additionally, the communication protocol disclosed herein provides for a standardized way of communicating data changes or data/signal requirements of connected devices, and the reasoning for each data change.

Verifying that a device functions properly within a CAN bus network system can be challenging. In an example embodiment, the CAN bus communication protocol disclosed herein allows one device to understand all possible data items transmitted by another device. This capability will not help verify the validity of data items that are sent, however it can be used to simplify the overall verification process by comparing a list of data items that a device should send to a list of data items that it can send. Discrepancies found when comparing these two lists can quickly highlight problems in a software's design for a given device or its implementation. For example, a dental chair should never originate data that configures or controls an electric micro-motor. Definitively knowing the chair's software does not have the technical ability to send such data can simplify the verification process.

In an example embodiment, the CAN bus communications protocol disclosed herein can be used to simultaneously maximize "data" bandwidth and allow any number of devices to "simultaneously" transmit the same data item (with identical or differing data values). A sufficient amount of information must be received by devices on the network allowing them to correctly reassemble multiple (potentially identical) chunks of data originating from multiple sources.

In an example embodiment, the CAN bus communication protocol disclosed herein can use CAN bus messages with an identifier that has an assumed priority in order to de-conflict simultaneous message transmissions by multiple devices (e.g., the lower the identifier value, the higher the priority). As explained herein (e.g., FIG. 4A) a CAN bus network can have a branched topography, using both Si-based and SK-based controllers (or hybrid controllers with low- and SK-based connectors), forming one or more CAN bus networks. The device topology of each network is largely dictated by the physical location of devices within the system, which can result in one network consisting primarily of low-rate messages with a particular priority mix, and another network with high-rate messages with a different mix of priorities. Due to the differing device topologies, the importance of a data item on one network does not necessarily translate to the same importance on other networks. For example, the data value representing a foot control's activation percentage may directly control the rotational speed of an electric micro-motor on one CAN network, requiring high-priority messages to rapidly accommodate the slightest change in position. However, the network containing the dental chair requires only low-priority messages to know when the foot control is active, not the precise position, in order to lock out chair movement. In this regard, the CAN bus communication protocol disclosed herein provides the ability for a single data item to be sent at different priority levels on different CAN networks within the same device system architecture.

Solutions: Plug-N-Play; Message Format

In accordance with an example embodiment of the disclosure, a CAN bus communication protocol disclosed herein implements device self-configuration capabilities, without any setup requirement and without using a master controller. Devices may be added or removed at any time without shutting down the network.

More specifically, every device/controller on the CAN bus network broadcasts an identification "heartbeat" message periodically (e.g., once every 500 milliseconds). The "heartbeat" message serves two purposes—it announces the presence of the device to others on the network, and the heartbeat message is encoded with, e.g., a network address (i.e., a nickname) and a unique device ID. The unique device ID can be, e.g., a combination of the device's manufacturer ID, a device type ID and a serialized device number. The unique device ID can be permanently assigned to a device during the manufacturing process, and cannot be reused. The nickname can be, e.g., a 5-bit value that is arbitrarily selected by each device, and can be associated with that device while the device maintains its presence on the CAN bus network through the regular transmission of "heartbeat" messages. Using a 5-bit nickname value supports the simultaneous presence of up to 32 devices on a single CAN bus network. By choosing a different bit size for the nickname, more or less devices may be accommodated on a single CAN bus network.

In an example embodiment, the nickname values are not shared between multiple networks. Should two devices happen to use the same nickname, the device with the smallest (lowest magnitude) unique device ID can retain the nickname, and the other device can select a new as-yet unused nickname value. Additionally, other devices on the network can detect when a given device is disconnected from the network (e.g., when a "heartbeat" message for the given device is no longer received).

In an example embodiment, once a device's nickname is accepted on the network (i.e., there are no other devices with conflicting nicknames), the device can broadcast a series of subscription request messages (SRMs) that identify all of the data items that should be transmitted to the device. For example, the SRM can identify one or more signals for sending to the device whenever the signals are generated, modified or updated. From that point forward, any device that generates the requested (subscribed to) piece of data will transmit such data item (using one or more messages on the CAN bus) to all of the devices subscribed to that data item.

FIGS. 6A-6B illustrate block diagrams of example message formats that can be used in a communication framework of a CAN bus controller network. Referring to FIGS. 6A-6B, the CAN bus communications protocol disclosed herein can be used to transmit data items where each data item is transmitted using a header message (602a) and zero or more additional multi-segment data messages (602b). In instances when the data item to be transmitted fits within the unused data bits of the header message 602a, then no multi-segment data messages are required.

FIG. 6A illustrates in greater detail example composition of the CAN message ID portion and the CAN message payload portion of a header message 602a, as well as alternative definitions that can be used as the message payload when the communicated message is a "heartbeat" message. FIG. 6B illustrates in greater detail the composition of the message ID portion and the message payload portion of a multi-segment data message 602b.

As previously described, each device on the network is associated with a nickname (network address). The device sending a CAN message embeds their 5-bit nickname value within the CAN message identifier (message ID) as the sender identifier (ID). Having the sender ID present in every message allows the recipients to correctly reassemble the multiple individual messages required to transmit a single data item, especially when multiple senders are simultaneously transmitting the messages for the same data item. The sending device also encodes the nickname values of each intended message recipient in an intended recipient field in the header message data payload portion, where each bit in the recipient field can directly correspond to one of the possible (e.g., 32) nickname values. Unicast (one-to-one) communication is achieved when only one recipient is identified in the header message recipient field. Multicast (one-to-multiple) communication is achieved when more than one recipient is identified in the recipient field. Finally, broadcast (one-to-all) communication is implied when transmitting "administrative" messages (e.g., "heartbeat" messages), or is explicitly achieved when all bits in the recipient field are set to 1 (including bits that do not correspond to an active nickname).

Synchronized, Precise Time Basis

In accordance with an example embodiment of the disclosure, the CAN bus communication protocol disclosed herein can perform de-conflicting "simultaneous" data updates by tagging each data item with the precise time of that update. The common definition of "current time" can be broadcast on the CAN bus periodically (e.g., every 200 milliseconds) from a device with Real-Time Clock (RTC) capabilities. If multiple devices possess RTC capabilities, the device with the smallest (lowest magnitude) unique device ID can continue to broadcast the RTC and all other devices can stop such RTC broadcast. If no device possesses RTC capability, then the device with the smallest unique device ID selects a predefined initial "current time" that all other devices synchronize to.

Example Communication between CAN Bus Devices

Figure 6C:
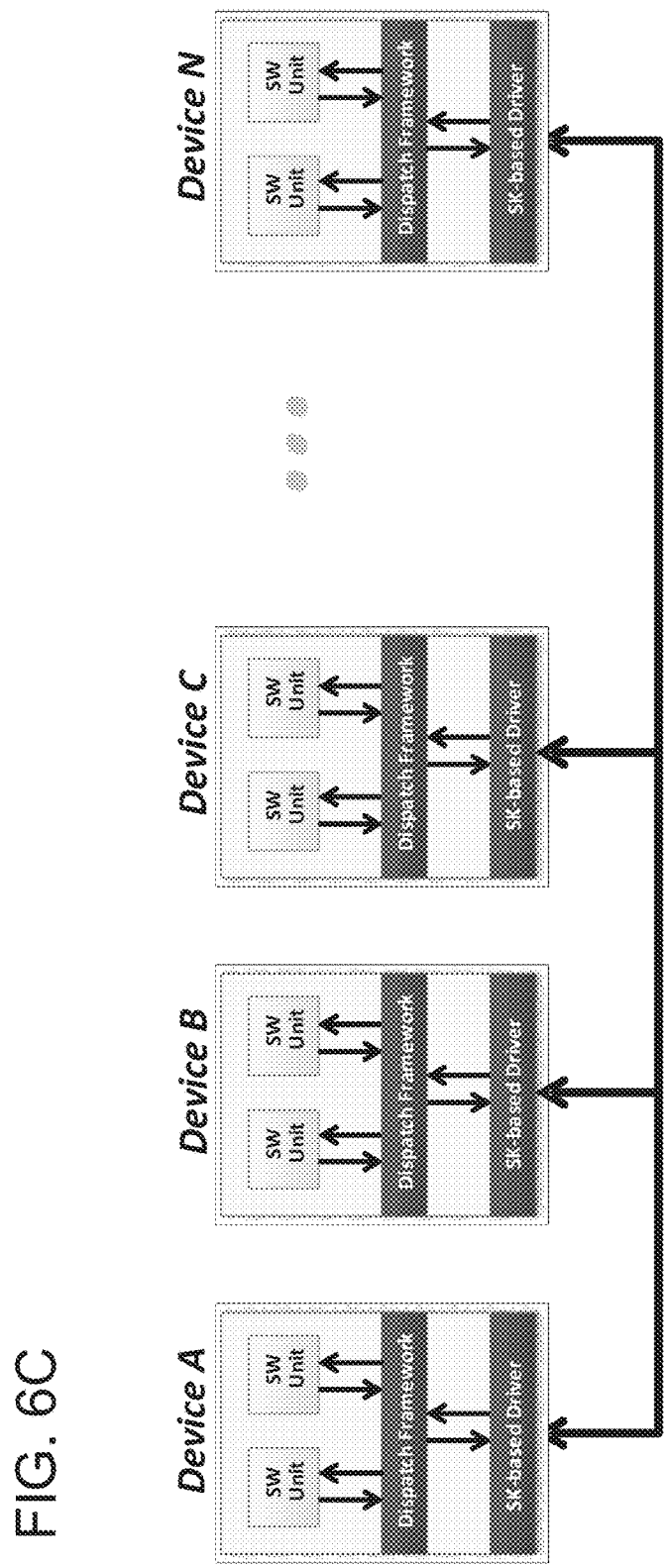

FIGS. 6C-6M illustrate various types of communications in a communication framework of a SJ-based and/or SK-based controller network. FIG. 6C illustrates an example communication framework of devices with communication bridge functionalities. As seen in FIG. 6C, each device (A-N) can be a CAN bus controller and can includes one or more software units (e.g., software executing on a microcontroller (or DSP) of the CAN bus controller). The dispatch framework on each controller may comprise suitable circuitry, interfaces, logic and/or code and can be used to coordinate activities and data flow between the software units. The communications bridge may comprise suitable circuitry, interfaces, logic and/or code and can be configured to link multiple dispatch frameworks together through a physical communication interface. In accordance with an example embodiment of the disclosure, the communication protocol used in the device network of FIG. 6C can enable automatic discovery of newly connected devices (e.g., via heartbeat messages) and the ability to create unique network identifiers.

Figure 6D:
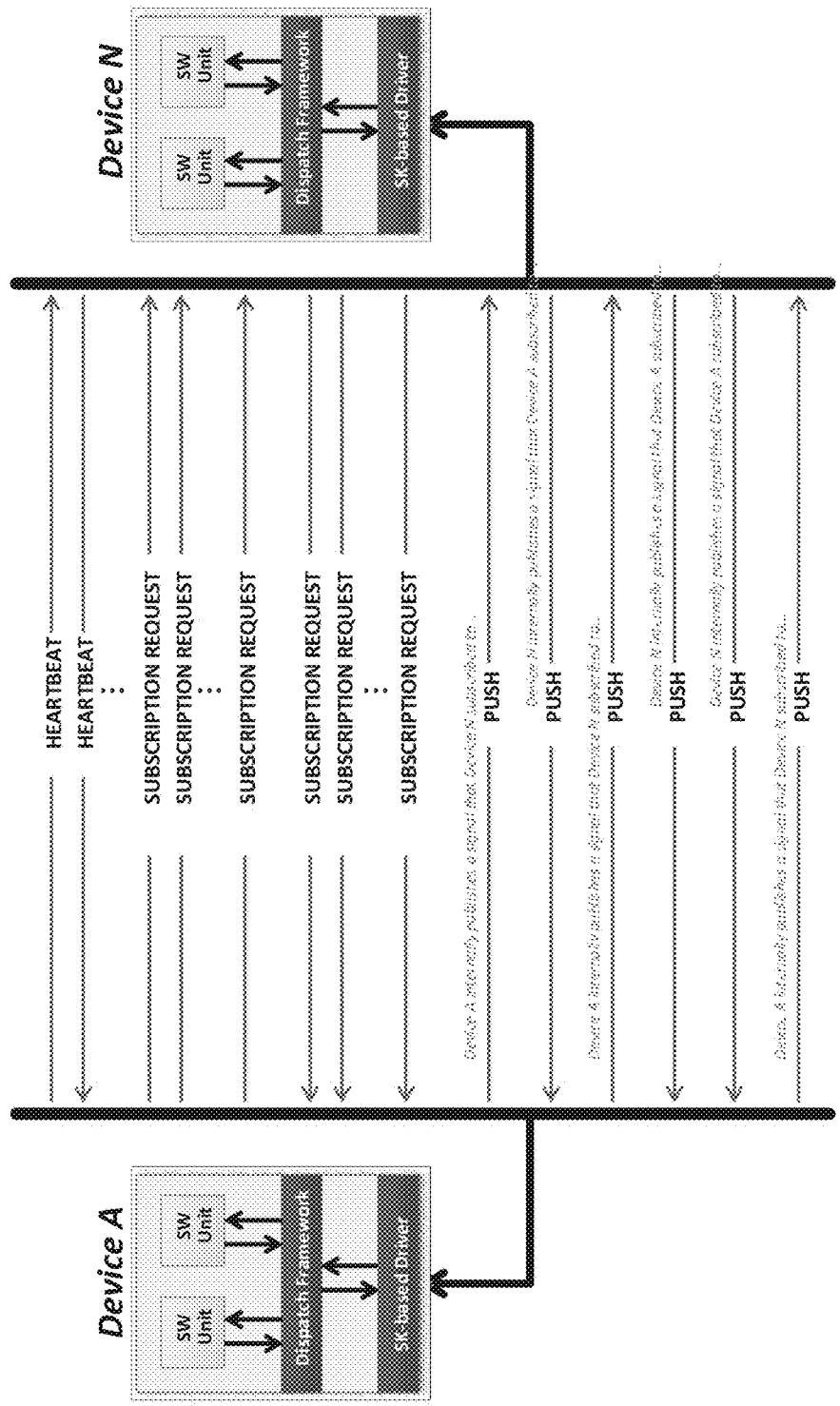

FIG. 6D illustrates general communication interactions in a CAN bus network using a CAN bus communication protocol. Referring to FIG. 6D, after heartbeat messages are initiated and periodically communicated by all devices, subscription request messages (SRMs) are also sent by each device. The SRMs can identify one or more signals for sending to the requesting device, whenever the signals are generated, modified or updated. The message IDs for SRMs can be the same as used for a heartbeat message, but a different action ID can be used in the message payload. When an SRM is received, the receiving device examines the identified recipients field, and if the bit corresponding to the recipient device is set, the recipient device performs the requested action (i.e., subscribes the requesting device to information that can be generated by the receiving device)

Once a stable network is established (i.e., all devices have exchanged heartbeat messages and a stable network address), each device will send a SRM to any new devices) on the network (e.g., the signal subscription communication identified in FIG. 6D). A given device does not know whether any new device(s) on the network may generate signals of interest, so the device sends a SRM to every new device on the network. As an example, device A can be a dental light circuit board. Initially, all other devices (B N) are new to the network, so the dental light will send a SRM to all other devices. Later, if say a new device such as an ultrasonic scaler controller is added, the dental light will only send a SRM to the ultrasonic scaler controller once the scaler has a stable network address.

Additionally, the SRM identifies specific messages of interest to the requesting device. For example, the SRM from the dental light will request to subscribe to any devices that produce signals of interest to the dental light, such as a command to change illuminance setting, change power on/off status, change from normal mode to cure-safe mode, etc. The control head circuit board, which receives inputs from the touchscreen interface, generates signals of interest to the dental light, so the control head circuit board adds the dental light to its list of subscribed devices for the particular signals, which the control head circuit board generates and the dental light is interested in. There will be other signals that the control head circuit board generates that the dental light does not require (these signals will not be added to the list of subscribed signals from the control head to the dental light).

In an example embodiment, each of devices A-N will store a record of the SRMs, i.e., a record of each requesting device and the type of signal the requesting device has subscribed to (which signal is generated by the receiving device). In the above example, the control head circuit board will maintain a record of all devices that wish to subscribe to each signal that the control head circuit board can generate. Accordingly, the control head circuit board will maintain a record that when it generates a signal to change dental light illuminance setting, that signal should be sent to the dental light.

Figure 6E:
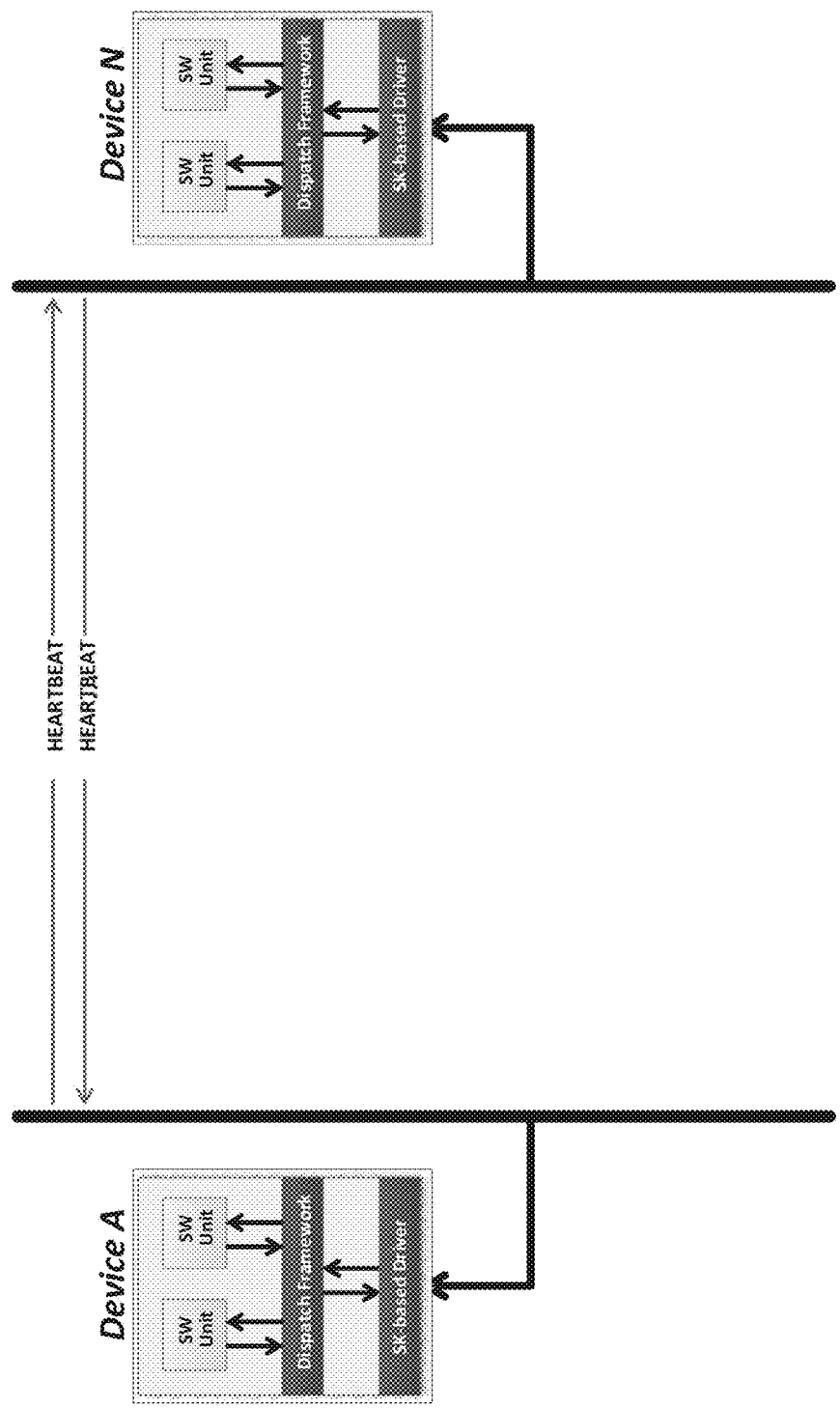

FIG. 6E illustrates the periodic communication of heartbeat messages. Each device sends a heartbeat message periodically, e.g., every 500 milliseconds. The heartbeat messages allow each device to uniquely identify each other device on the network (discovery phase). When a device's heartbeat is no longer detected, it is assumed that device went "offline" and is no longer present on the network. Each device has a unique device ID (as described above) that is permanently assigned when the device is manufactured. Each device also has a unique network ID (as described above) that is self-assigned during the discovery phase and is only unique within the context of the attached communications network. Should more than one device select the same unique network ID, the device with the smallest (lowest magnitude) unique device ID will retain this chosen unique network ID and the conflicting device(s) must choose a new unique network ID that has not yet been observed on the network.

Figure 6F:
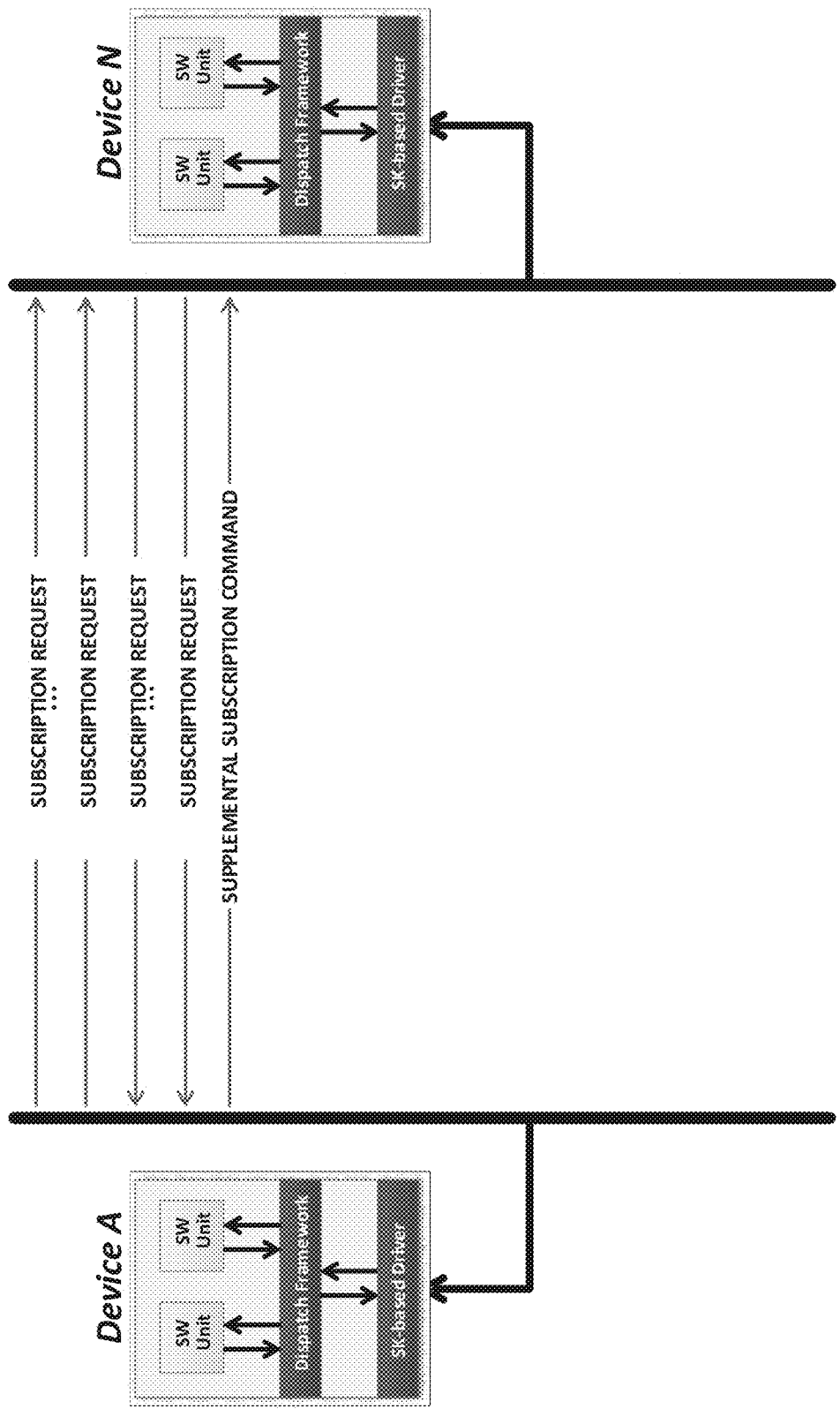

FIG. 6F illustrates the exchange of SRMs. As seen in FIG. 6F, there are two ways to initiate subscription request messages (SRMs). Each device is configured from the factory with a default set of signals it will subscribe to. Additionally, another device on the same CAN bus network can send one or more supplemental subscription commands (SSCs) to the subscribing device, instructing it to issue additional SRMs above and beyond its default set. These supplemental, non-default SRMs can be used, e.g., to subscribe to signals that control advanced or "unlocked" functionality within the subscribing device. Once a device produces stable heartbeat messages (e.g., five heartbeat messages with the same Unique Network ID), communication can begin directly with that device by sending subscription message(s). SRMs identify signals that a device wishes to receive.

The SSCs are used in instances when a given device (device A) identifies one or more signals required for functionality within another device (e.g., device N). The identified signal(s) (useful for device N) can originate from device A or from another device. Device A can send an SSC to device N, commanding device N to subscribe to the identified signals that are essential to or can be used by device N. Device N, in response, sends an SRM for the signal(s) identified by the SSC. Each device can maintain a mapping (e.g., a stored record) within their SK-based driver (or in designated storage area of the device) of all other devices and their corresponding subscriptions. Whenever a device internally publishes a signal, the SK-based driver checks this mapping to see which, if any, other devices have subscribed to that signal. If subscriptions are found, the internally published signal is forwarded to each subscribed device.

In an example embodiment, a software developer can determine, at compile time, which signals the device wishes to receive from other devices (e.g., default set of signal subscriptions).

FIG. 6G illustrates an example data flow. Each device that internally publishes a signal can also forward (push) it to all other devices that subscribed to that signal. When a subscription is received for a signal that has already been published internally, the sending device will immediately push the last-published signal to the new subscriber so it has the most recent version of the data. A Pull request manually activates a publisher's Push mechanism for a specified signal.

Figure 6H:
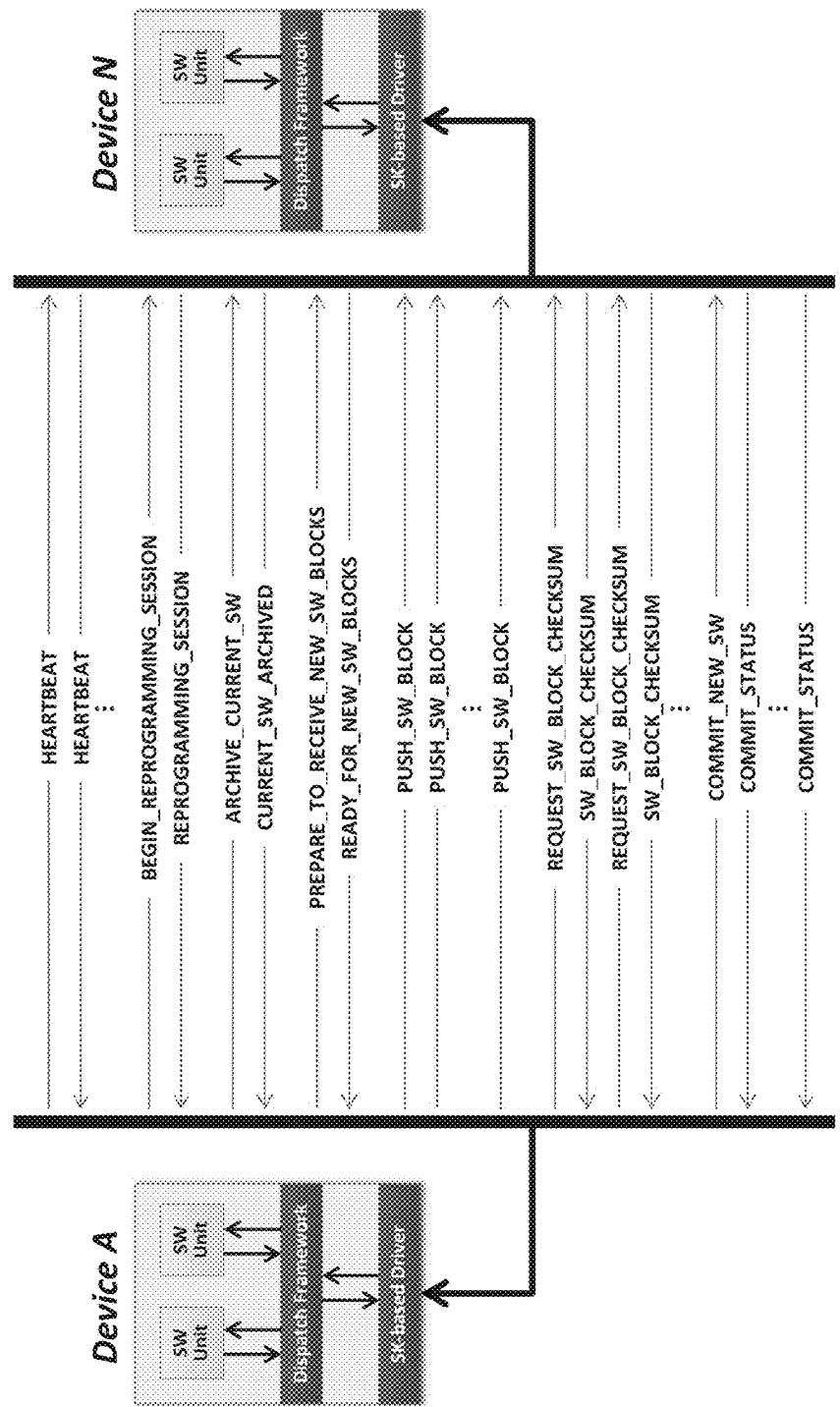

FIG. 6H illustrates example reprogramming interactions, in accordance with an example embodiment of the disclosure. More specifically, new software can be pushed from device A to device N for re-programming one or more software modules of device N.

Figure 6I:
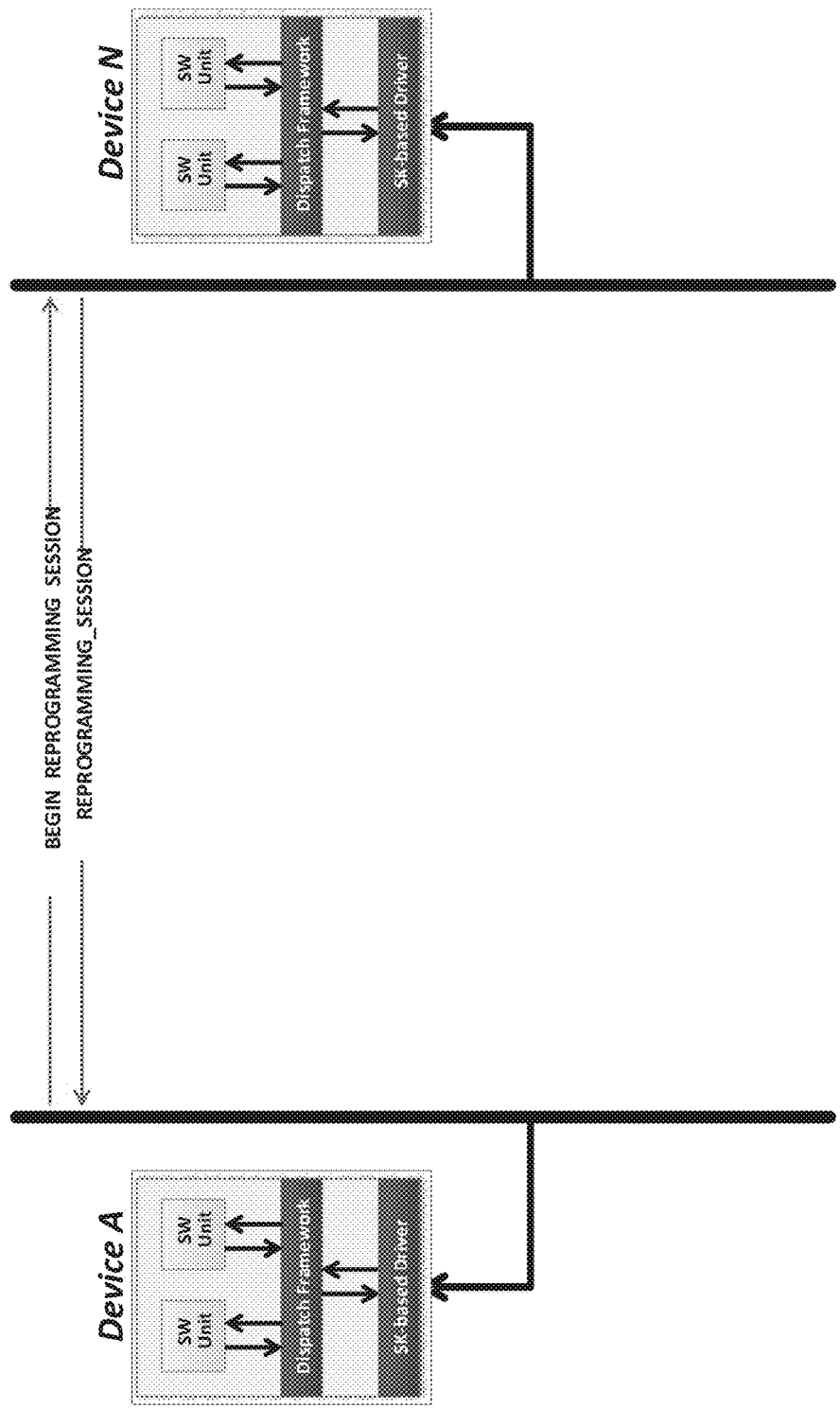
Figure 6J:
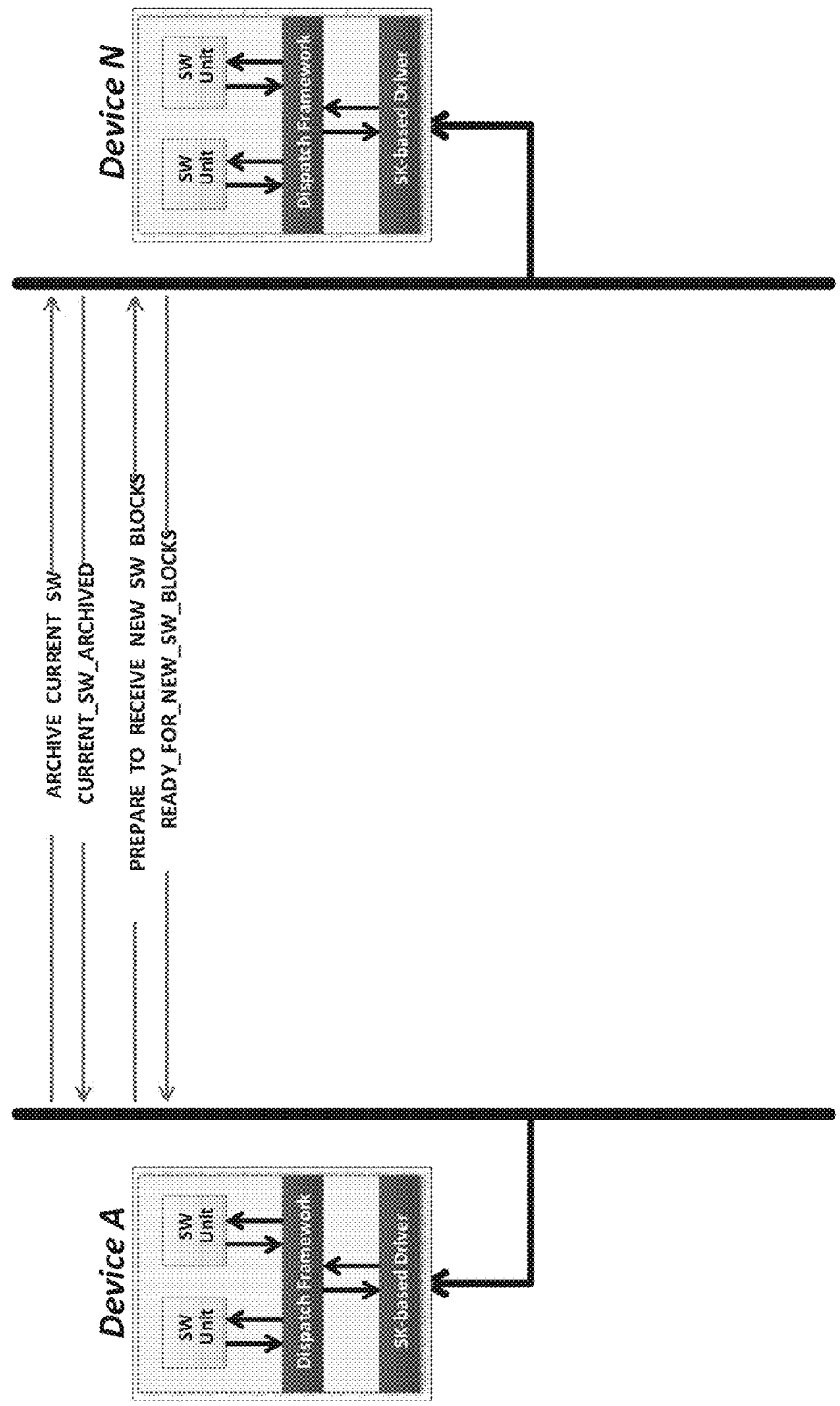
Figure 6L:
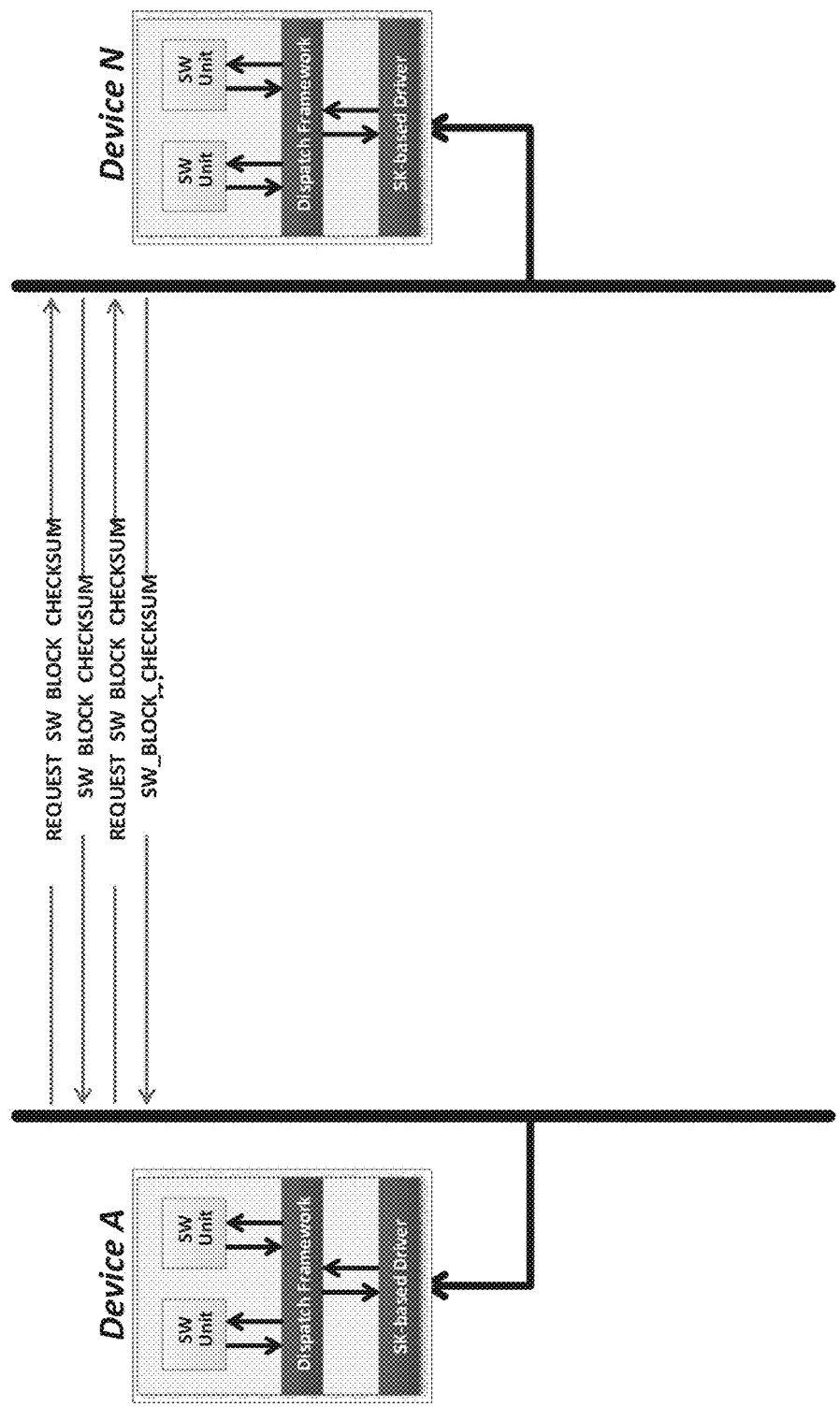
Figure 6M:
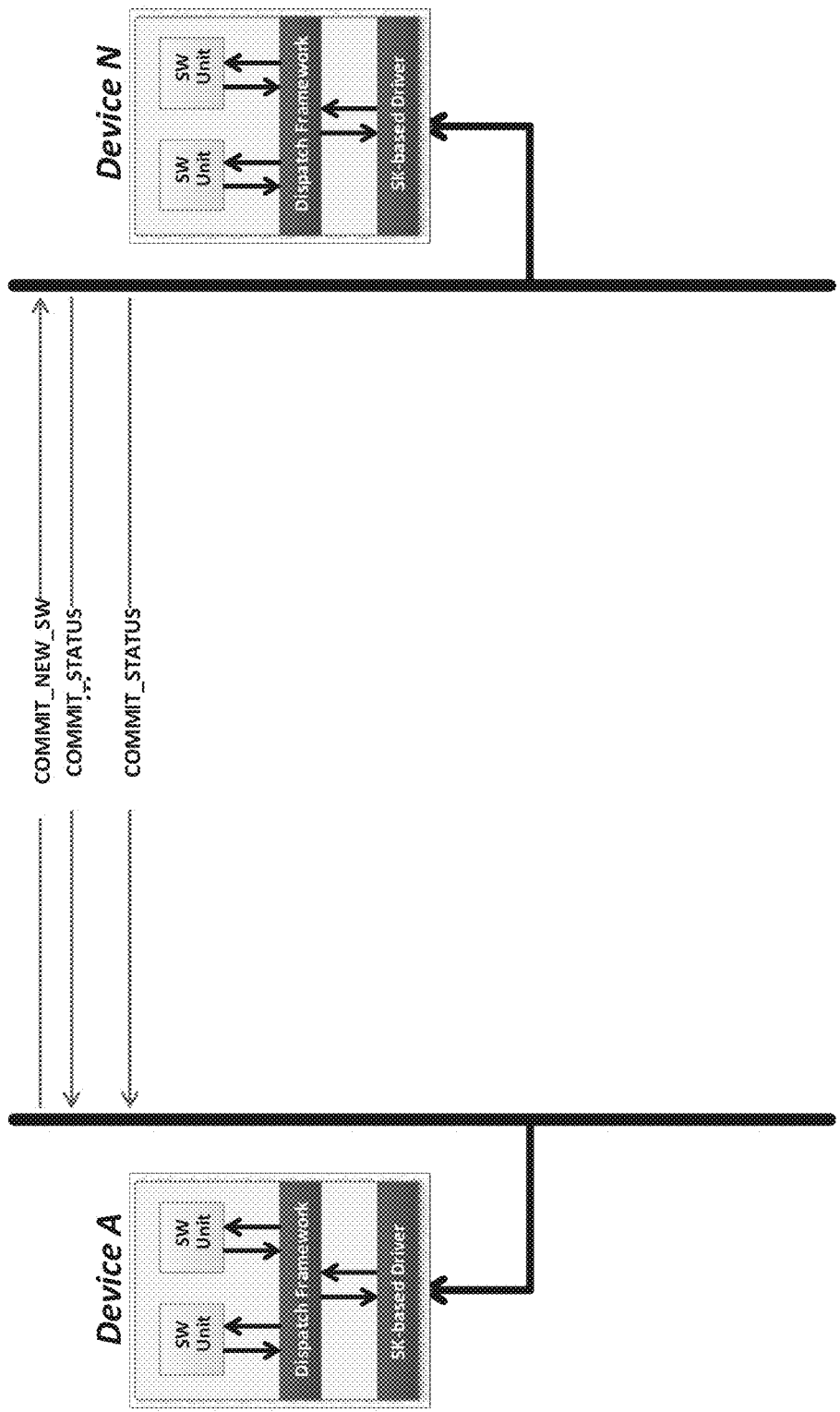

FIG. 6I illustrates an example message exchange for initiating a reprogramming session. FIG. 6J illustrate example reprogramming preparations. FIG. 6K illustrates downloading of new software for reprogramming of device N. FIG. 6L illustrates an example message exchange for software download verification. FIG. 6M illustrates an example message exchange for committing new software.

Example Methods

Figure 7:
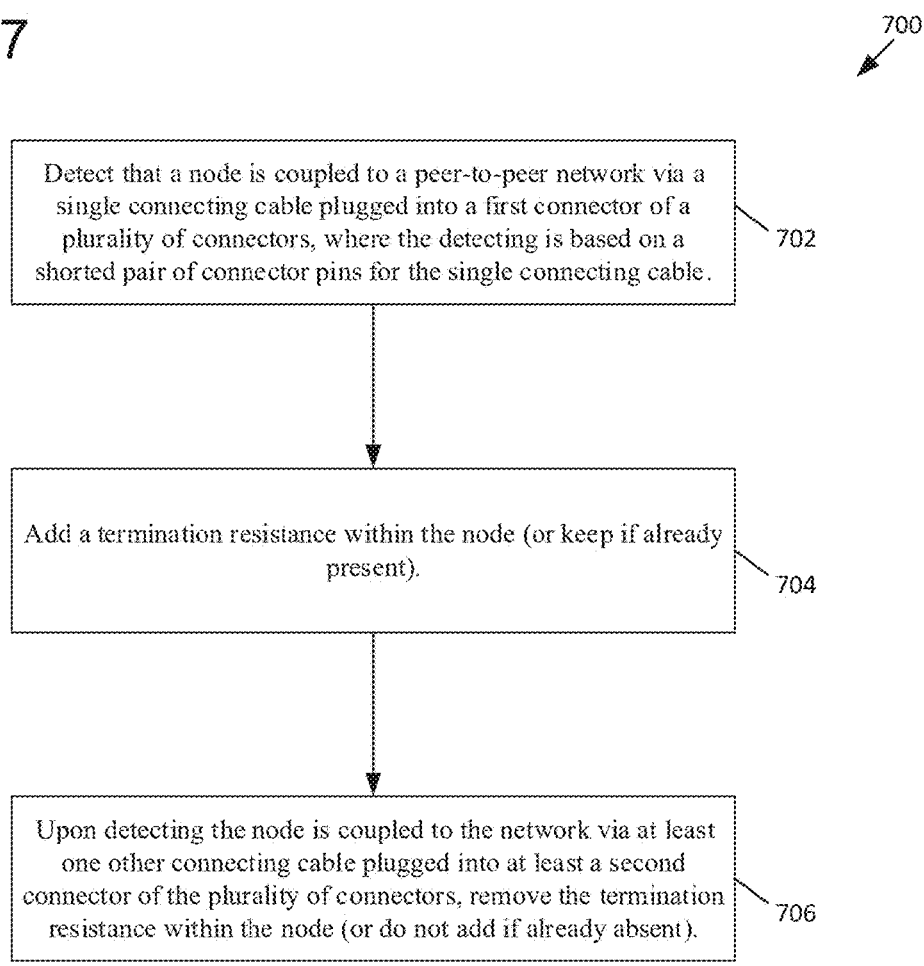
FIG. 7 is a flow diagram of an example method for cable detection and self-terminating a network node, in accordance with an example embodiment of the disclosure.

FIG. 7 is a flow diagram of an example method for cable detection and self-terminating a network node, in accordance with an example embodiment of the disclosure. Referring to FIGS. 3A and 7, the example method 700 may include a method for dynamically switching termination resistance in a network node, where the node is connected in a peer-to-peer network via at least one of a plurality of available connectors. At 702, a detection circuit (e.g., 310a) can detect that the node (e.g., 301) is coupled to the network via a single connecting cable (e.g., 302f) plugged into a first connector (e.g., 306a) of the plurality of connectors. The detecting can be based on, e.g., a shorted pair of connector pins (e.g., pins 5 and 6, as seen in pin diagram 303d) for the single connecting cable (302f). Other ways to detect that the node is coupled to the network via a connecting cable include using electro-mechanical switches, Infrared or RFID functionality implemented in the connector, magnetics, optical detection (e.g., by using broken beam enabled detection), and so forth. At 704, a termination resistance within the node is added (or kept if already in place). At 706, upon detecting the node (301) is coupled to the network via at least one other connecting cable plugged into at least a second connector (e.g., 308*a*) of the plurality of connectors, the termination resistance (e.g., 316*a*) within the node is removed (or not added if already absent).

Figure 8:
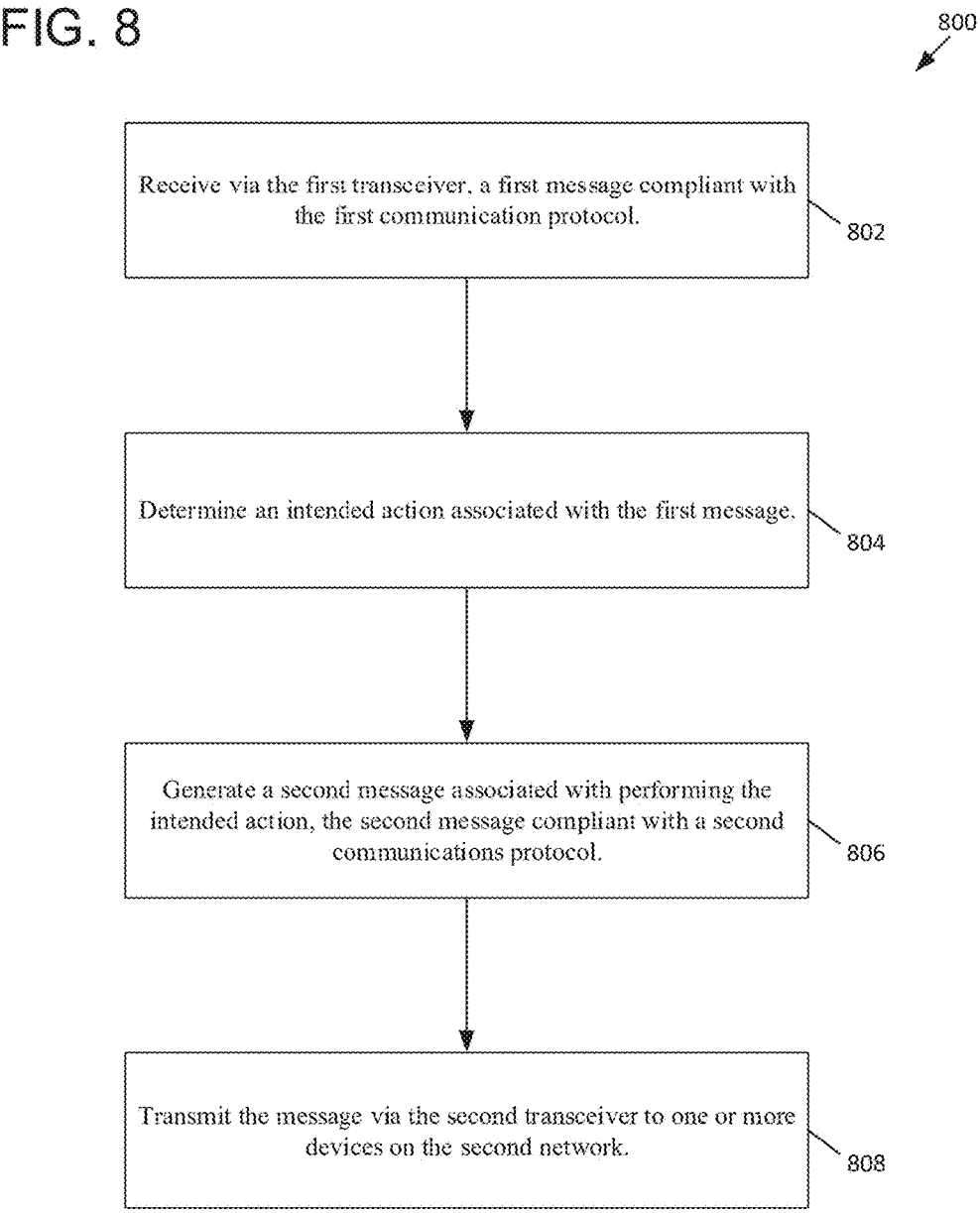
FIG. 8 is a flow diagram of an example method of communicating between nodes associated with different communication protocols, in accordance with an example embodiment of the disclosure.

FIG. 8 is a flow diagram of an example method of communicating between nodes associated with different communication protocols, in accordance with an example embodiment of the disclosure. Referring to FIGS. 4B and 8, the example method 800 can include operations for exchanging information between a first and a second networks. At 802, a first message or set of messages compliant with a first communication protocol receiving via a first transceiver. For example, the controller 402*b* can receive a first message via the SJ-based connector 418*b* and the transceiver 416*b*. At 804, the bridge 406*b* can determine an intended action associated with the first message. At 806, the bridge 406*b* can generate (or can have the microcontroller 404*b* or another component of the controller 402*b*) a second message associated with performing the intended action, the second message compliant with a second communications protocol (e.g., the second message can be compliant with a SK-based CAN bus, such as the bus connected to SK-based connector 410*b*). At 808, the generated second message is transmitted via a second transceiver (e.g., 408*b*) to one or more devices on the second network (e.g., one or more devices coupled to the controller 402*b* via the SK-based connector 410*b*).

Example Computing Environment

Figure 9:
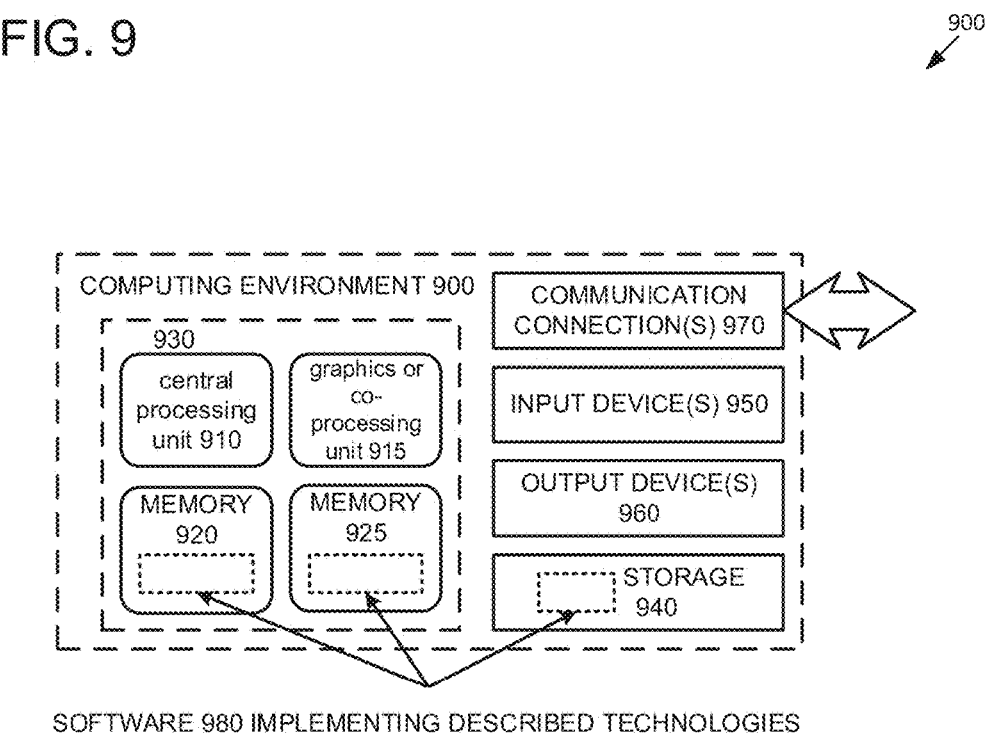
FIG. 9 illustrates a generalized example of a suitable computing environment in which described embodiments, techniques, and technologies can be implemented.

FIG. 9 illustrates a generalized example of a suitable computing environment 900 in which described embodiments, techniques, and technologies can be implemented. The computing environment 900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 9, the computing environment 900 includes at least one processing unit 910 and memory 920. In FIG. 9, this most basic configuration 930 is included within a dashed line. The block-based processing unit 910 executes computer-executable instructions and may be a real or a virtual processor. In a multi-processing system, multiple processing units execute computer-executable instructions to increase processing power and as such, multiple processors can be running simultaneously. The memory 920 may be volatile memory (e.g., registers, cache, RAM), non-volatile memory (e.g., ROM, EEPROM, flash memory, etc.), or some combination of the two. The memory 920 stores software 980, images, audio and video that can, for example, implement the technologies described herein. A computing environment may have additional features. For example, the computing environment 900 includes storage 940, one or more input devices 950, one or more output devices 960, and one or more communication connections 970. An interconnection mechanism (not shown) such as a bus, a controller, or a network, interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and that can be accessed within the computing environment 900. The storage 940 stores instructions for the software 980, plugin data, and messages, which can be used to implement technologies described herein.

The input device(s) 950 may be a touch input device, such as a keyboard, keypad, mouse, touch screen display, pen, or trackball, a voice input device, a scanning device, or another device, that provides input to the computing environment 900. For audio, the input device(s) 950 may be a sound card or similar device that accepts audio input in analog or digital form, or a CD-ROM reader that provides audio samples to the computing environment 900. The output device(s) 960 may be a display, printer, speaker, CD-writer, or another device that provides output from the computing environment 900.

The communication connection(s) 970 enable communication over a communication medium (e.g., a connecting network) to another computing entity. The communication medium conveys information such as computer-executable instructions, compressed graphics information, video, or other data in a modulated data signal. The communication connection(s) 970 are not limited to wired connections (e.g., CAN bus network, megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Computer-readable media are any available media that can be accessed within a computing environment 900. By way of example, and not limitation, with the computing environment 900, computer-readable media include memory 920 and/or storage 940. As should be readily understood, the term computer-readable storage media includes the media for data storage such as memory 920 and storage 940, and not transmission media such as modulated data signals.

Additional Examples of the Disclosed Technology

Additional examples of the disclosed subject matter are discussed herein in accordance with the examples discussed above.

In one embodiment, a system includes a plurality of nodes connected in a peer-to-peer network via a communication interface. At least one node possesses the capability to modify the termination resistance within the at least one node based on whether the node is a network endpoint or non-endpoint. The at least one node possessing this capability includes a transceiver, at least two connectors, and at least one termination resistance module coupled to the transceiver. The at least one termination resistance module provides termination resistance within the node. The node also includes a first detection circuit coupled to a first connector of the at least two connectors, and a second detection circuit coupled to a second connector of the at least two connectors. The detection circuits are configured to detect that the node is coupled to one or more other nodes in the peer-to-peer network, and automatically adjust the termination resistance based on the detecting.

The communication bus can be a Controller Area Network (CAN) bus. The at least two connectors are RJ50 connectors, and the transceiver is a CAN transceiver. The node further includes a termination circuit coupled to the at least one termination resistance module. The termination circuit is configured to add or remove the termination resistance based on the detecting. The detection circuit is configured to determine the node is a non-endpoint by detecting that the at least two connectors are coupled to at least two of the other nodes. Upon determining the node is a non-endpoint, the termination resistance within the node can be modified (e.g., can be removed, impedance can be added to the termination resistance, the termination resistance can be left not activated, and so forth). The detection circuit is configured to determine the node is an endpoint by detecting that only one of the at least two connectors is coupled to at least one of the other nodes. Upon determining the node is an endpoint, the termination resistance within the node is added, kept present, or otherwise modified. The termination resistance is a high-speed termination resistance substantially equal to about 99.8Ω. The termination resistance is present within the node by default, when the node is unconnected to one or more of the other nodes or the node is an endpoint (e.g., the termination resistance is added or activated if already present).

The first detection circuit is configured to generate a first logic HIGH signal when the first connector is unconnected. The second detection circuit is configured to generate a second logic HIGH signal when the second connector is unconnected. The first detection circuits is configured to generate a first logic LOW signal when the first connector is connected to the communication bus via a first connector cable plugged into the first connector. The second detection circuits is configured to generate a second logic LOW signal when the second connector is connected to the communication bus via a second connector cable plugged into the second connector. The first detection circuit is configured to generate the first logic LOW signal upon detecting a shorted connection between at least two connector pins within the first connector cable. The second detection circuit is configured to generate the second logic LOW signal upon detecting a shorted connection between at least two connector pins within the first connector cable. The communication bus is a high-speed CAN bus, the node is a high-speed CAN node, and the first detection circuit is further configured to detect the node is coupled to at least a second node via a first connection cable based on a first pair of shorted pins within the first connection cable. The first detection circuit is further configured to detect the at least second node is a low-speed CAN node based on a second pair of shorted pins within the first connection cable, the second pair being different from the first pair. The first detection circuit is further configured to adjust the termination resistance from a high-speed termination resistance to a low-speed termination resistance based on detecting the at least second node is a low-speed CAN node. The high-speed termination resistance is approximately 99.8Ω, and the low-speed termination resistance is approximately 330Ω.

In one embodiment, a method for dynamically switching termination resistance in a network node is disclosed, where the node is connected in a peer-to-peer network via at least one of a plurality of available connectors. The method includes adding a termination resistance within the node, upon detecting that the node is coupled to the network via a single connecting cable coupled to a first connector of the plurality of connectors. The detecting is based on a shorted pair of connector pins for the single connecting cable. Upon detecting the node is coupled to the network via at least one other connecting cable plugged into at least a second connector of the plurality of connectors, the termination resistance within the node is removed. The method further includes detecting at least two connector pins for each of the connecting cables at the first and second connectors are shorted. Upon detecting the at least two connector pins for each of the connecting cables are shorted, at least two logical signals corresponding to the at least two connecting cables are generated, and the termination resistance within the node is deactivated (or removed or otherwise modified) based on the logical signals.

In one embodiment, a computing device (e.g., a dental device) includes a processing unit, at least a first transceiver configured to operate in a first network associated with a first communications protocol, and at least a second transceiver configured to operate in a second network associated with a second communications protocol. The first and second transceivers are coupled to the processing unit. The device further includes a SK-based (e.g., high-speed) termination resistance module associated with the first transceiver, and a SJ-based (e.g., low-speed) termination resistance module associated with the second transceiver. The processing unit is configured to perform operations for exchanging information between the first and the second networks. The operations include receiving via the first transceiver, a first message compliant with the first communication protocol. An intended action associated with the first message is determined. A second message associated with performing the intended action is generated, the second message being compliant with the second communications protocol. The message is transmitted via the second transceiver to one or more devices on the second network.

The operations further include detecting a first pair of shorted connector pins, the first pair of shorted pins being at a connector associated with the second transceiver. Upon detecting the first pair of shorted pins, the low-speed termination resistance module is activated to provide low-speed termination resistance at the connector associated with the second transceiver (e.g., the termination resistance can be added if previously was not connected, can be kept present if it was previously connected, or it can otherwise be modified). Upon detecting that the first transceiver is not connected to the first network while the second transceiver is connected to the second network, the termination resistance associated with the first transceiver is modified (e.g., can be removed, impedance can be added to the termination resistance, the termination resistance can be left not activated, and so forth). The operations can further include detecting a second pair of shorted connector pins. The second pair of shorted pins can be at a connector associated with the first transceiver. Upon detecting the second pair and the first pair of pins are shorted, the high-speed termination resistance module is de-activated (e.g., the termination resistance can be modified, removed, impedance can be added to the termination resistance, the termination resistance can be left not activated, and so forth). The first network is a high-speed CAN network (e.g., SK-based network), and the second network is a low-speed CAN network (e.g., SJ-based network).

In one embodiment, a method for communicating information in a peer-to-peer network of a plurality of nodes can include receiving at a first node of the plurality of nodes, a subscription request from a second node of the plurality of nodes. The subscription request can specify one or more signals to be sent by the first node to the second node whenever the one or more signals are generated, modified, or updated. Mapping data is generated by the first node, based on the subscription request. The mapping data can identify signal subscriptions of one or more of the plurality of nodes. The mapping data is stored in a memory of the first node. The mapping data is updated upon receipt of at least another subscription request from at least a third node of the plurality of nodes. Prior to receiving the subscription request, a heartbeat message is received at the first node from the second node of the plurality of nodes, the heartbeat message identifying the second node as a device connected on the peer-to-peer network. A second subscription request is sent by the first node to the second node, the second subscription request identifying one or more signals which may be generated by the second node and to which the first node is requesting to subscribe. A supplemental subscription command is sent by the first node to the second node. The supplemental subscription command commands the second node to initiate a subscription request for one or more identified signals that can be used by the second node and that may be generated by the first node or one or more other nodes of the plurality of nodes.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

Any computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A system, comprising:
   a plurality of nodes connected in a peer-to-peer network via a communication interface wherein at least one node of the plurality of nodes comprises:
   a transceiver;
   at least two connectors;
   at least one termination resistance module coupled to the transceiver, the at least one termination resistance module providing termination resistance within the node;
   a first detection circuit coupled to a first connector of the at least two connectors; and
   a second detection circuit coupled to a second connector of the at least two connectors, wherein the first and second detection circuits are configured to detect that the node is coupled to one or more other nodes in the peer-to-peer network, and automatically adjust the termination resistance based on the detecting; and
   a controller coupled to the first detection circuit and the second detection circuit, wherein the controller is coupled to a first ground that is electrically isolated from a second ground coupled to the communication interface.

2. The system according to claim 1, wherein the communication interface is a Controller Area Network (CAN) bus.

3. The system according to claim 2, wherein the at least two connectors are RJ50 connectors, and the transceiver is a CAN transceiver.

4. The system according to claim 1, wherein the node further comprises a termination circuit coupled to the at least one termination resistance module, the termination circuit is configured to add or remove the termination resistance based on the detecting.

5. The system according to claim 4, wherein the detection circuit is configured to:
  determine the node is a non-endpoint by detecting that the at least two connectors are coupled to at least two of the other nodes; and
  upon determining the node is a non-endpoint, remove or otherwise not activate the termination resistance within the node.

6. The system according to claim 4, wherein the detection circuit is configured to:
  determine the node is an endpoint by detecting that only one of the at least two connectors is coupled to at least one of the other nodes; and
  upon determining the node is an endpoint, add the termination resistance within the node.

7. The system according to claim 1, wherein the termination resistance is a high-speed termination resistance substantially equal to 99.8Ω.

8. The system according to claim 1, wherein the termination resistance is present within the node by default, when the node is unconnected to one or more of the other nodes or the node is an endpoint.

9. The system according to claim 1, wherein:
  the first detection circuit is configured to generate a first logic HIGH signal when the first connector is unconnected; and
  the second detection circuit is configured to generate a second logic HIGH signal when the second connector is unconnected.

10. The system according to claim 1, wherein:
  the first detection circuits is configured to generate a first logic LOW signal when the first connector is connected to the communication interface via a first connector cable plugged into the first connector; and
  the second detection circuits is configured to generate a second logic LOW signal when the second connector is connected to the communication interface via a second connector cable plugged into the second connector.

11. The system according to claim 10, wherein:
  the first detection circuit is configured to generate the first logic LOW signal upon detecting a shorted connection between at least two connector pins within the first connector cable; and
  the second detection circuit is configured to generate the second logic LOW signal upon detecting a shorted connection between at least two connector pins within the first connector cable.

12. The system according to claim 1, wherein the communication interface is a high-speed CAN bus, the node is a high-speed CAN node, and the first detection circuit is further configured to:
  detect the node is coupled to at least a second node via a first connection cable based on a first pair of shorted pins within the first connection cable.

13. The system according to claim 12, wherein the first detection circuit is further configured to:
  detect the at least second node is a low-speed CAN node based on a second pair of shorted pins within the first connection cable, the second pair different from the first pair.

14. The system according to claim 13, wherein the first detection circuit is further configured to:
  adjust the termination resistance from a high-speed termination resistance to a low-speed termination resistance based on detecting the at least second node is a low-speed CAN node.

15. The system according to claim 14, wherein:
  the high-speed termination resistance is approximately 99.8Ω; and
  the low-speed termination resistance is approximately 330Ω.

16. A system, comprising:
  a plurality of nodes connected in a peer-to-peer network via a communication bus wherein at least one node of the plurality of nodes comprises:
  a transceiver;
  at least one termination resistance module coupled to the transceiver, the at least one termination resistance module providing termination resistance within the at least one node;
  a first detection circuit coupled to a first connector;
  a second detection circuit coupled to a second connector, wherein the first and second detection circuits are configured to detect that the node is coupled to one or more other nodes in the peer-to-peer network, and automatically adjust the termination resistance based on the detecting; and
  a controller coupled to the first detection circuit and the second detection circuit, wherein a ground of the controller is electrically isolated from a ground of the communication bus, and wherein the controller is configured to detect that the first and second connectors are connected to the communication bus, but there are no communications on the communication bus, and is configured to generate an error condition in response to the no communications on the communication bus.

17. The system according to claim 16, wherein the communication bus is a Controller Area Network (CAN) bus.

* * * * *